(12) United States Patent
Ward

(10) Patent No.: US 7,672,738 B2
(45) Date of Patent: *Mar. 2, 2010

(54) PROGRAMMABLE CONTROLLER FOR USE WITH MONITORING DEVICE

(76) Inventor: Derek Ward, 11 Tui Vala Road, Cockle Bay, Howick, Auckland (NZ)

( * ) Notice: Subject to any disclaimer, the term of this patent is extended or adjusted under 35 U.S.C. 154(b) by 1009 days.

This patent is subject to a terminal disclaimer.

(21) Appl. No.: 09/986,650

(22) Filed: Nov. 9, 2001

(65) Prior Publication Data
US 2002/0099455 A1 Jul. 25, 2002

(30) Foreign Application Priority Data
Nov. 9, 2000 (NZ) ..................................... 508052

(51) Int. Cl.
*G05B 11/01* (2006.01)
(52) U.S. Cl. .............................. 700/11; 326/40; 326/46
(58) Field of Classification Search .................. 700/11, 700/17, 18, 83, 86, 90, 95; 716/16–18; 326/40, 326/46
See application file for complete search history.

(56) References Cited

U.S. PATENT DOCUMENTS

| | | | |
|---|---|---|---|
| 4,117,317 A | 9/1978 | Dooley, Jr. et al. .......... 235/307 |
| 4,275,455 A * | 6/1981 | Bartlett ......................... 700/1 |
| 4,303,990 A | 12/1981 | Seipp .......................... 364/900 |
| 4,802,116 A * | 1/1989 | Ward et al. ..................... 703/23 |
| 4,845,627 A * | 7/1989 | Nadolski et al. ............. 700/112 |
| 5,057,994 A * | 10/1991 | Spiller .......................... 700/79 |
| 5,166,604 A | 11/1992 | Ahanin et al. ................ 324/158 |
| 5,369,314 A | 11/1994 | Patel ............................ 326/13 |
| 5,498,975 A | 3/1996 | Cliff et al. .................... 326/10 |
| 5,528,169 A | 6/1996 | New .............................. 326/40 |
| 5,550,843 A | 8/1996 | Yee .............................. 371/22.3 |
| 5,555,214 A | 9/1996 | Sung et al. ................... 365/221 |
| 5,583,450 A | 12/1996 | Trimberger et al. ........... 326/41 |
| 5,590,305 A | 12/1996 | Terrill et al. ................. 395/430 |
| 5,600,263 A | 2/1997 | Trimberger et al. ........... 326/39 |
| 5,617,327 A | 4/1997 | Duncan ....................... 364/489 |
| 5,617,573 A | 4/1997 | Huang et al. ................. 395/376 |
| 5,629,637 A | 5/1997 | Trimberger et al. ........... 326/93 |
| 5,650,734 A | 7/1997 | Chu et al. ...................... 326/38 |
| 5,675,589 A | 10/1997 | Yee .............................. 371/22.3 |

(Continued)

OTHER PUBLICATIONS

"Virtex-E 1.8 V FPGAs: Preliminary Product Specification". Xilinx (Sep. 20, 2000) DS022 v1.7.*

*Primary Examiner*—Ryan A Jarrett
(74) *Attorney, Agent, or Firm*—Jacobson Holman PLLC

(57) ABSTRACT

A programmable controller includes at least one user input interface, and an input register, at least one user output interface, programmable logic hardware and program loading means.

The user input interface and input register is for connection to process plant and/or machinery to provide sampled and stored input data in digital form. The user output interface is for connection to process plant and/or machinery and receives output data in digital form. The programmable logic hardware includes a plurality of basic logic elements and electrically configurable interconnections. The interconnections are configurable to interconnect the logic elements as a user control program circuit and to connect the user control program circuit to the input and output interfaces. The program loading means enables the user to configure the programmable logic hardware as a circuit implementing a user control program prior to initiating control of the associated process plant and/or machinery.

7 Claims, 10 Drawing Sheets

U.S. PATENT DOCUMENTS

| | | | | |
|---|---|---|---|---|
| 5,691,912 | A | 11/1997 | Duncan | 364/490 |
| 5,761,483 | A | 6/1998 | Trimberger | 395/500 |
| 5,764,079 | A | 6/1998 | Patel et al. | 326/40 |
| 5,802,540 | A | 9/1998 | Sung et al. | 711/1 |
| 5,825,662 | A | 10/1998 | Trimberger | 364/491 |
| 5,838,584 | A | 11/1998 | Kazarian | 364/491 |
| 5,838,954 | A | 11/1998 | Trimberger | 395/500 |
| 5,844,422 | A | 12/1998 | Trimberger et al. | 326/38 |
| 5,869,980 | A | 2/1999 | Chu et al. | 326/38 |
| 5,870,410 | A | 2/1999 | Norman et al. | 371/22.2 |
| 5,875,112 | A | 2/1999 | Lee | 364/489 |
| 5,894,420 | A | 4/1999 | Duncan | 364/489 |
| 5,898,628 | A | 4/1999 | Mielke et al. | 365/201 |
| 5,963,565 | A | 10/1999 | Rezvani et al. | 371/22.1 |
| 5,970,005 | A * | 10/1999 | Yin et al. | 365/201 |
| 5,978,260 | A | 11/1999 | Trimberger et al. | 365/182 |
| 5,986,467 | A | 11/1999 | Trimberger | 326/40 |
| 6,020,758 | A | 2/2000 | Patel et al. | 326/40 |
| 6,026,481 | A | 2/2000 | New et al. | 712/43 |
| 6,034,536 | A | 3/2000 | McClintock et al. | 326/10 |
| 6,085,317 | A | 7/2000 | Smith | 713/1 |
| 6,091,258 | A | 7/2000 | McClintock et al. | 326/10 |
| 6,091,263 | A * | 7/2000 | New et al. | 326/40 |
| 6,107,820 | A | 8/2000 | Jefferson et al. | 326/38 |
| 6,107,821 | A | 8/2000 | Kelem et al. | 326/38 |
| 6,128,692 | A | 10/2000 | Sung et al. | 711/1 |
| 6,134,707 | A | 10/2000 | Herrmann et al. | 717/5 |
| 6,157,210 | A | 12/2000 | Zaveri et al. | 326/40 |
| 6,166,559 | A | 12/2000 | McClintock et al. | 326/10 |
| 6,167,001 | A | 12/2000 | Wu | 368/113 |
| 6,173,438 | B1 | 1/2001 | Kodosky et al. | 717/1 |
| 6,180,425 | B1 | 1/2001 | Mielke et al. | 438/15 |
| 6,182,020 | B1 | 1/2001 | Fairbanks | 702/117 |
| 6,182,247 | B1 | 1/2001 | Herrmann et al. | 714/39 |
| RE37,060 | E | 2/2001 | Sung et al. | 365/221 |
| 6,195,772 | B1 | 2/2001 | Mielke et al. | 714/724 |
| 6,201,404 | B1 | 3/2001 | Reddy et al. | 326/10 |
| 6,202,185 | B1 | 3/2001 | Lee | 714/726 |
| 6,205,579 | B1 | 3/2001 | Southgate | 717/11 |
| 6,212,650 | B1 | 4/2001 | Guccione | 714/32 |
| 6,219,628 | B1 | 4/2001 | Kodosky et al. | 703/2 |
| 6,219,785 | B1 | 4/2001 | Smith | 713/1 |
| 6,222,382 | B1 | 4/2001 | Jefferson et al. | 326/38 |
| 6,223,313 | B1 * | 4/2001 | How et al. | 714/724 |
| 6,233,205 | B1 | 5/2001 | Wells et al. | 368/118 |
| 6,239,611 | B1 | 5/2001 | Matera | 326/16 |
| 6,243,304 | B1 | 6/2001 | Patel et al. | 365/189 |
| 6,247,147 | B1 | 6/2001 | Beenstra et al. | 714/39 |
| 6,255,848 | B1 | 7/2001 | Schultz et al. | 326/41 |
| 6,263,430 | B1 | 7/2001 | Trimberger et al. | 713/1 |
| 6,286,114 | B1 | 9/2001 | Veenstra et al. | 714/39 |
| 6,292,116 | B1 | 9/2001 | Wang et al. | 341/100 |
| 6,311,149 | B1 | 10/2001 | Ryan et al. | 703/21 |
| 6,317,860 | B1 | 11/2001 | Heile | 716/5 |
| 6,337,578 | B2 | 1/2002 | Jefferson et al. | 326/38 |
| 6,344,755 | B1 | 2/2002 | Reddy et al. | 326/10 |
| 6,351,145 | B1 | 2/2002 | Lesea | 326/41 |
| 6,389,558 | B1 | 5/2002 | Herrmann et al. | 714/39 |
| 6,408,432 | B1 | 6/2002 | Herrmann et al. | 717/139 |
| 6,411,124 | B2 | 6/2002 | Lee et al. | 326/41 |
| 6,425,077 | B1 | 7/2002 | Le et al. | 713/1 |
| 6,452,459 | B1 | 9/2002 | Chan et al. | 331/57 |
| 6,453,456 | B1 | 9/2002 | Price | 716/16 |
| 6,460,148 | B2 | 10/2002 | Veenstra et al. | 714/39 |
| 6,463,339 | B1 * | 10/2002 | Vasko | 700/18 |
| 6,481,000 | B1 | 11/2002 | Zaveri et al. | 716/17 |
| 6,484,298 | B1 | 11/2002 | Nag et al. | 716/6 |
| 6,487,709 | B1 | 11/2002 | Keller et al. | 716/14 |
| 6,490,714 | B1 | 12/2002 | Kurniawan et al. | 716/17 |
| 6,501,297 | B1 | 12/2002 | Kong | 326/41 |
| 6,507,211 | B1 | 1/2003 | Schultz et al. | 326/37 |
| 6,510,546 | B1 | 1/2003 | Blodget | 716/16 |
| 6,510,548 | B1 | 1/2003 | Squires | 716/16 |
| 6,525,557 | B1 | 2/2003 | McManus et al. | 326/8 |
| 6,525,562 | B1 | 2/2003 | Schultz et al. | 326/39 |
| 6,525,678 | B1 | 2/2003 | Veenstra et al. | 341/55 |
| 6,526,566 | B1 | 2/2003 | Austin | 717/109 |
| 6,538,469 | B1 | 3/2003 | Nguyen et al. | 326/40 |
| 6,539,508 | B1 | 3/2003 | Patrie et al. | 714/726 |
| 6,539,510 | B1 | 3/2003 | St. Pierre, Jr. | 714/727 |
| 6,539,534 | B1 | 3/2003 | Bennett | 716/17 |
| 6,557,156 | B1 | 4/2003 | Guccione | 716/17 |
| 6,584,601 | B1 * | 6/2003 | Kodosky et al. | 716/4 |
| 6,601,221 | B1 | 7/2003 | Fairbanks | 716/5 |
| 6,608,638 | B1 | 8/2003 | Kodosky et al. | 345/771 |
| 6,611,932 | B2 * | 8/2003 | How et al. | 714/724 |
| 6,618,686 | B2 | 9/2003 | Allamsetty | 702/120 |
| 6,625,787 | B1 | 9/2003 | Baxter et al. | 716/6 |
| 6,625,795 | B1 | 9/2003 | Anderson et al. | 716/16 |
| 6,625,797 | B1 | 9/2003 | Edwards et al. | 716/18 |
| 6,629,311 | B1 | 9/2003 | Turner et al. | 716/17 |
| 6,631,508 | B1 | 10/2003 | Williams | 716/8 |
| 6,636,936 | B2 | 10/2003 | Terrill et al. | 711/103 |
| 6,658,564 | B1 | 12/2003 | Smith et al. | 713/100 |
| 6,668,237 | B1 | 12/2003 | Guccione et al. | 702/119 |
| 6,675,310 | B1 | 1/2004 | Bloom et al. | 713/500 |
| 6,691,267 | B1 | 2/2004 | Nguyen et al. | 714/725 |
| 6,704,889 | B2 | 3/2004 | Veenstra et al. | 714/39 |
| 6,711,674 | B1 | 3/2004 | Burnham | 713/1 |
| 6,714,040 | B1 | 3/2004 | Jacobson et al. | 326/38 |
| 6,714,044 | B1 | 3/2004 | Rangan et al. | 326/40 |
| 6,715,139 | B1 | 3/2004 | Kodosky et al. | 717/125 |
| 6,720,793 | B1 | 4/2004 | Trimberger | 326/9 |
| 6,732,263 | B1 | 5/2004 | May et al. | 713/1 |
| 6,732,309 | B1 | 5/2004 | Toutounchie et al. | 714/725 |
| 6,732,348 | B1 | 5/2004 | Tahoori et al. | 716/16 |
| 6,734,703 | B1 | 5/2004 | Alfke et al. | 326/38 |
| 6,738,962 | B1 | 5/2004 | Flaherty et al. | 716/17 |
| 6,748,368 | B1 | 6/2004 | Trimberger et al. | 705/500 |
| 6,751,751 | B1 | 6/2004 | Murray et al. | 714/34 |
| 6,754,862 | B1 * | 6/2004 | Hoyer et al. | 714/725 |
| 6,754,878 | B1 | 6/2004 | Stentz et al. | 716/7 |
| 6,754,882 | B1 | 6/2004 | Sanchez et al. | 716/16 |
| 6,760,898 | B1 | 7/2004 | Sanchez et al. | 716/16 |
| 6,766,505 | B1 | 7/2004 | Rangan et al. | 716/16 |
| 6,784,903 | B2 | 8/2004 | Kodosky et al. | 345/771 |
| 6,802,026 | B1 | 10/2004 | Patterson et al. | 714/35 |
| 6,802,053 | B1 | 10/2004 | Dye et al. | 717/113 |
| 6,807,631 | B2 | 10/2004 | Fuller, III | 713/100 |
| 6,812,731 | B1 | 11/2004 | Trimberger | 326/10 |
| 6,817,006 | B1 | 11/2004 | Wells et al. | 716/16 |
| 6,823,283 | B2 | 11/2004 | Steger et al. | 702/127 |
| 6,826,717 | B1 | 11/2004 | Draper et al. | 714/39 |
| 6,839,874 | B1 | 1/2005 | Fang | 714/738 |
| 6,842,034 | B1 | 1/2005 | Chan et al. | 326/8 |
| 6,842,039 | B1 | 1/2005 | Guzman et al. | 326/38 |
| 6,857,092 | B1 | 2/2005 | Fox | 714/733 |
| 6,862,724 | B1 | 3/2005 | Riley et al. | 716/17 |
| 6,871,331 | B1 | 3/2005 | Bloom et al. | 716/4 |
| 6,877,150 | B1 | 4/2005 | Miller et al. | 716/18 |

* cited by examiner

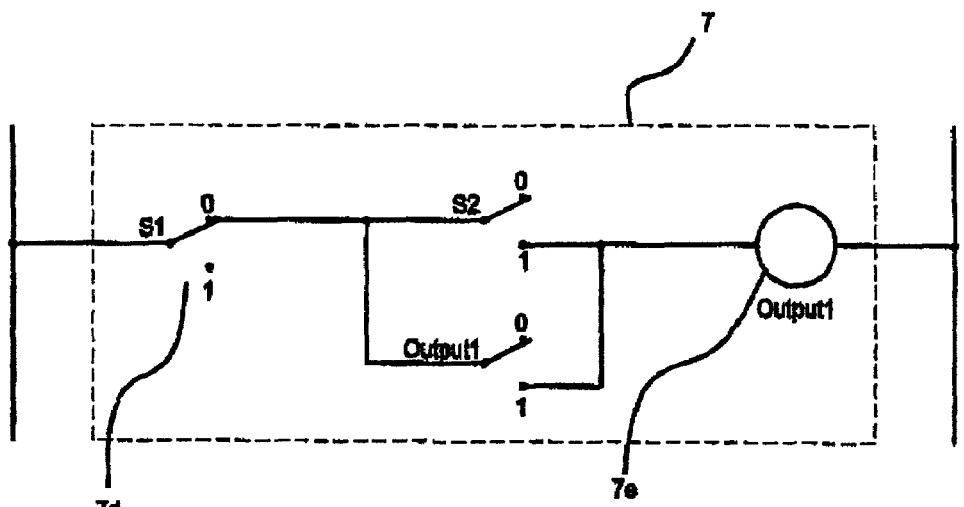
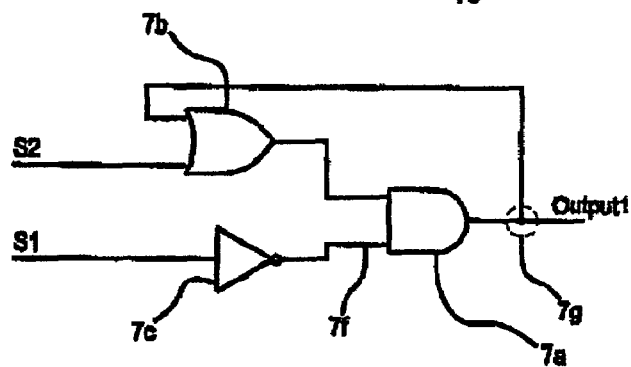
Fig. 2c    Ouput1 = (NOT S1) AND (S2 OR Output1)
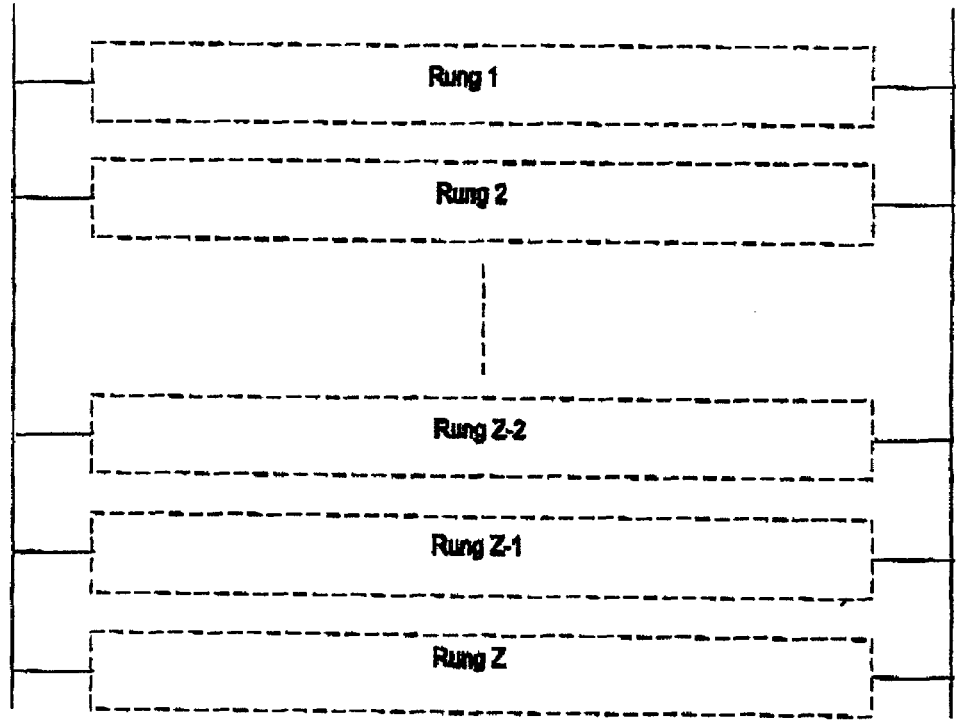

PROGRAMMABLE CONTROLLER FOR USE WITH MONITORING DEVICE

BACKGROUND OF THE INVENTION

Field of the Invention

The present invention relates to programmable controllers.

SUMMARY OF THE PRIOR ART

Programmable controllers were first developed in the 1960s when they were developed as replacements for control systems built with electrical relays.

Today, programmable controllers are highly capable, general-purpose industrial control systems, programmable in the sense that the end user can configure the required control functionality within the controller. They exist in many forms ranging from very simple low cost systems to very complex powerful systems.

ABBREVIATIONS AND SYMBOLS

The following abbreviations will be used in the text—
DFB—Diagnostic Function Block
I/O—Input/Output [system]
ISO—International Standards Organisation
LPC—Logic Processing Circuit
MC—Monitoring Computer
NSC—Non Storage Circuit
PLD—Programmable Logic Device
SC—Storage Circuit Various standardized symbols are also used throughout the drawings. Examples of these are found as follows—
An input connector 10 in FIG. 5.
An output connector 16 in FIG. 5.
An interface circuit 11 or 15 in FIG. 5.
An AND gate 7a in FIG. 2b.
An OR gate 7b in FIG. 2b.
An XOR gate 104 in FIG. 12.
An inverter 7c in FIG. 2b.
A D flip-flop 9a in FIG. 4.
A multiplexer 94 in FIG. 11.
A programmable interconnection 33 in FIG. 6.
A switch 7d in FIG. 2a.
A ladder diagram output coil 7e FIG. 2a.
A single signal connection 7f in FIG. 2b. This symbol, when associated with block symbols, may also indicate generalised interconnections.
A contacting connection point 7g in FIG. 2b.
A non-contacting connection crossover 30a in FIG. 6.
A signal path 93, operative temporarily as and when required, is shown in FIG. 11. This symbol is also used to indicate a transfer of control as and when required in FIG. 3.
A multi-signal bus connection 54 in FIG. 8. Circuit elements, such as switches, shown in a bus connection imply separate circuit elements as required for each bus signal.
A generalised channel for data transfer and control 49 in FIG. 8.
A dashed line 19a, not being part of a box or circle, in FIG. 6, implies the presence of additional detail of the kind found at the ends of the line in the space occupied by the line.

Current Architecture

Current programmable controllers are designed as shown in FIG. 1. They consist of a processor 1 communicating with memory 2 and Input/Output (I/O) devices 3 & 4 respectively. The memory is arranged to hold a program 5 and data 6, which when processed, enables the Programmable Controller to function in the way required by the end-user for the purpose of controlling a process plant and/or machinery via the I/O.

The Programmable Controller operates by reading input values, processing those values together with internally stored values generated during programming or earlier processing, and thereby arriving at values to be further stored or written to output devices in order to control the process plant and/or machinery.

In essence, current programmable controllers are special purpose computers, often with highly modular and configurable special I/O systems designed to interface with the process being controlled. It should be noted that the processor shown may in fact be more than one processor, each assigned their own tasks. One processor may handle the I/O, and another the processing of the user control program.

User Programming Methods

Because programmable controllers were designed originally to replace relay systems and to be used by personnel who were familiar with relay ladder diagrams (wiring diagrams), the traditional method for entering and displaying the Programmable Controller user control program was as a ladder diagram. A ladder diagram is illustrated in FIG. 2d and an example of an individual rung in the ladder is illustrated in FIG. 2a. A ladder diagram can be entered into the Programmable Controller and viewed using a specially configured computer screen and keyboard, or printed as hard copy. The program could also be processed by the computer in any of the ways common to normal data processing, including being stored on disk, translated and presented in some other applicable form, analysed for information contained, and of course run as a program under the control of an operating system.

As time progressed it became apparent that there were alternative ways of expressing the Programmable Controller user control program. These included methods using logic diagrams, function blocks, state diagrams, sequential function charts, as well as pure text file form. Many of the methods proving most popular have been formalised as part of the ISO standard IEC 1131, which can be used as a good example to help understand the methods being discussed.

Essential Characteristics

All of these systems rely on the Programmable Controller having a processor, which processes a software user control program using input data and stored data to determine what should be stored for later use and/or written to the outputs.

The essential characteristics of a processor are the processing of a program, as evidenced by the program instructions stored in memory and the existence of the Fetch and Execute cycles of the processor. These cycles fetch instructions from memory and execute the necessary operations defined by the instructions.

The program may be of a kind that is directly executed, or that relies on an interpreter.

Existing programmable controllers are relatively slow because all processing tasks are channelled through one or at most a few processors.

Functionality

The control functionality normally provided by a Programmable Controller consists broadly of—

1. Logic Control, which evaluates logic conditions and enables actions to occur, such as turning an alarm on if a pressure is too high.

2. Sequence Control, such as carrying out a predefined sequence of operations to process a part through a drilling machine.
3. Function Block control, such as counting the number of parts processed through a drilling machine.

A Programmable Controller will also provide system monitoring. These subjects are discussed below.

Logic Control

A simple example of control logic as used with programmable controllers is illustrated in FIGS. 2a, 2b, and 2c. FIG. 2a represents a single rung of a ladder diagram. A typical ladder program as shown in FIG. 2d consists of many rungs, normally each with different logic.

Logic may be expressed in three alternative and equivalent ways—ladder diagram, logic diagram as shown in FIG. 2b, and logic equation form, FIG. 2c. It should be noted that wherever one form is used, it is also logically equivalent to use either of the other two forms.

Note that in the discussion of logic functions, the word 'false' may also be taken to mean 'off', '0', 'low' or 'deactivated', and the word 'true' may be taken to mean 'on', '1', 'high' or 'activated' dependent on the context.

Starting with initial conditions where S1, S2 and Output1 are all false, the operation of the example logic can be described as follows—
1. If S2 now goes true, Output1 becomes true.
2. If S2 now goes false, Output1 stays true.
3. If S1 now goes true, Output1 becomes false.
4. If S1 now goes false, Output1 stays false.

Note that if S1 is true, it overrides the effect of S2.

Sequence Control

Programmable controllers provide sequence control programming entered and displayed by a variety of means such as sequential function charts and state diagrams.

A sequence control scheme allows a user to define a control step consisting of actions to be carried out until the occurrence of some terminating condition, and then to direct control to some next control step. The whole scheme describes an interconnected network of steps defining the necessary sequence of operations.

A simple example of sequence control for a drilling machine is shown in descriptive form in FIG. 3.

Function Block

Function blocks are used in Programmable Controller programs to provide functionality that can be displayed and manipulated at a higher level than simple logic. Function blocks, or their equivalent, are found in many forms of Programmable Controller programming, and encapsulate the associated logic to hide unnecessary complexity from the user.

FIG. 4 illustrates a function block 8 with its associated inputs and outputs, 8a and 8b respectively, and shows a simple example of logic 9 that may be hidden within such a function block.

In a Programmable Controller based around a program executed by a processor, a function block broadly represents a pre-programmed software object.

A simple example might be a timer function block requiring the user to provide no more than a customised time delay value and specify a run/stop signal. A counter would be another simple example.

A more complex function block might provide servo motor positioning functionality and require the user to provide extensive setup data followed by a series of new values representing the successive positions the motor is required to assume.

System Monitoring

A processor based Programmable Controller uses its processing capability to provide necessary system monitoring functions.

System monitoring is the process of loading a user control program into a controller and, by observing system activity and making necessary adjustments, bringing the system to a satisfactory state of operation. The system monitoring functions allow the user to display and modify both the user control program and data, to control the running of the program and also monitor the proper operation of the program and the system. Means of ensuring that the controller recovers from or is turned off if processing or other errors occur, are normally also provided.

The performance of the detailed tasks required to provide these services are normally split between the Programmable Controller and a computer arranged for monitoring the Programmable Controller but separate to it. The monitoring computer (MC) is normally only attached during development of the control system and user control program, but not during normal use and operation of the Programmable Controller.

SUMMARY OF THE INVENTION

It is an object of the present invention to provide a programmable controller which will at least go some way towards improving on the prior art and or which will at least provide the industry with a useful choice.

Accordingly the present invention consists in a programmable controller including:

at least one user input interface and an input register for connection to process plant and/or machinery to provide sampled and stored input data in digital form, at least one user output interface and an output register for connection to process plant and/or machinery to receive and store output data in digital form, programmable logic hardware including a plurality of basic logic elements and electrically configurable interconnections, said interconnections configurable to interconnect the logic elements as a user control program circuit and to connect the user control program circuit to said input and output interfaces, program loading means to enable the user to configure the programmable logic hardware as a circuit implementing a user control program prior to initiating control of the associated process plant and/or machinery.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the present invention will now be described with reference to the accompanying drawings in which:

FIG. 2a shows an example of the logic in one rung of a ladder diagram.

FIG. 2b shows the logic of FIG. 2a but in logic diagram form.

FIG. 2c shows the logic of FIG. 2a but in logic equation form.

FIG. 2d shows a ladder diagram with rungs marked 1 to Z.

FIG. 6 shows an example of I/O circuits and a logic processing circuit.

FIG. 7 is a timing diagram for the system.

FIG. 8 shows a configuration with two logic processing circuits as may be used when editing a running program.

FIG. 9 shows an arrangement that allows the exchange of state data between a logic processing circuit and a circuit external to it.

FIG. 10 shows support circuits used with the arrangement of FIG. 9.

FIG. 11 shows an arrangement allowing the necessary management of state data in the system.

FIG. 12 shows an arrangement allowing operational failures to be detected.

FIG. 13 shows an arrangement allowing operational failures to be corrected and operation continued.

DETAILED DESCRIPTION OF THE PREFERRED EMBODIMENTS

The programmable controller architecture of the present invention operates without the need for a processor or a user control program in the form of software instructions. Instead, the user control program is present as an actual circuit functionally equivalent to the user control program entered into the MC.

The circuit representing the user control program is implemented using logic elements, such as gates and flip-flops, and electrically programmable interconnection means. Both the logic elements and the programmable interconnection means are provided in hardware form.

The term 'hardware form' means that the gates and flip-flops provided are actual circuits and the interconnections conduct actual electric current along their length. That is in contrast to the logic elements and interconnections of existing programmable controllers, which do not exist as such in a physical form. A display of the existing Programmable Controller logic elements and interconnections on an MC screen is just a representation of processor data in a convenient form to simplify comprehension.

Electrically programmable interconnections are conductors, permanently positioned and provided with permanently positioned electrically activated switches that are designed and positioned to connect the conductor with adjacent conductors or logic elements. The logic elements are permanently positioned in a pattern with the programmable interconnections distributed around them in such a way that a desired logic circuit can be configured from the logic elements and interconnections by appropriate activation and de-activation of the switches.

In the invention, the programmable interconnections are used to interconnect the logic elements as required to implement the logic circuit representing the required user control program. We will refer to the circuit as a Logic Processing Circuit (LPC). The user control program is provided to the Programmable Controller in the form of a bit pattern used to configure the switches. Specific bits in the bit pattern correspond to specific switches and determine whether the switches shall be configured on or off.

Figure 1:
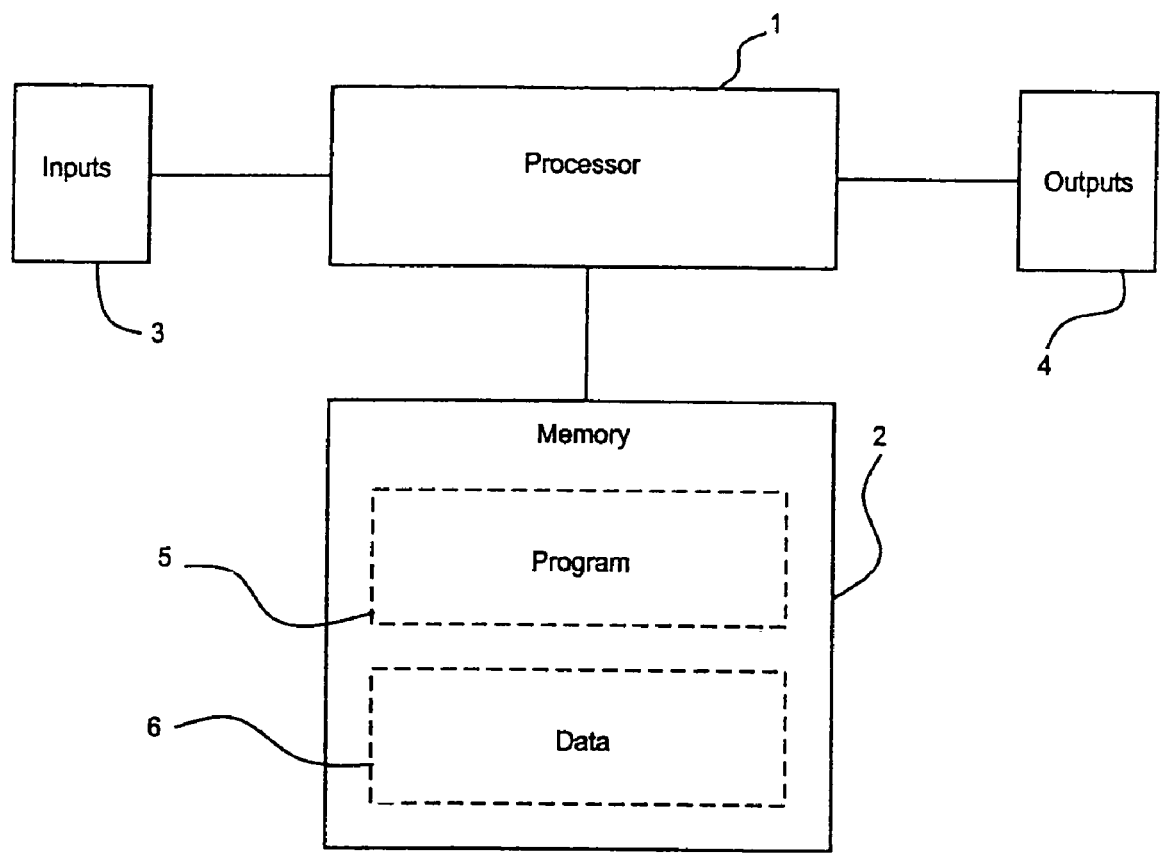
FIG. 1 is a block diagram of a conventional programmable controller with a processor and software program.
Figure 3:
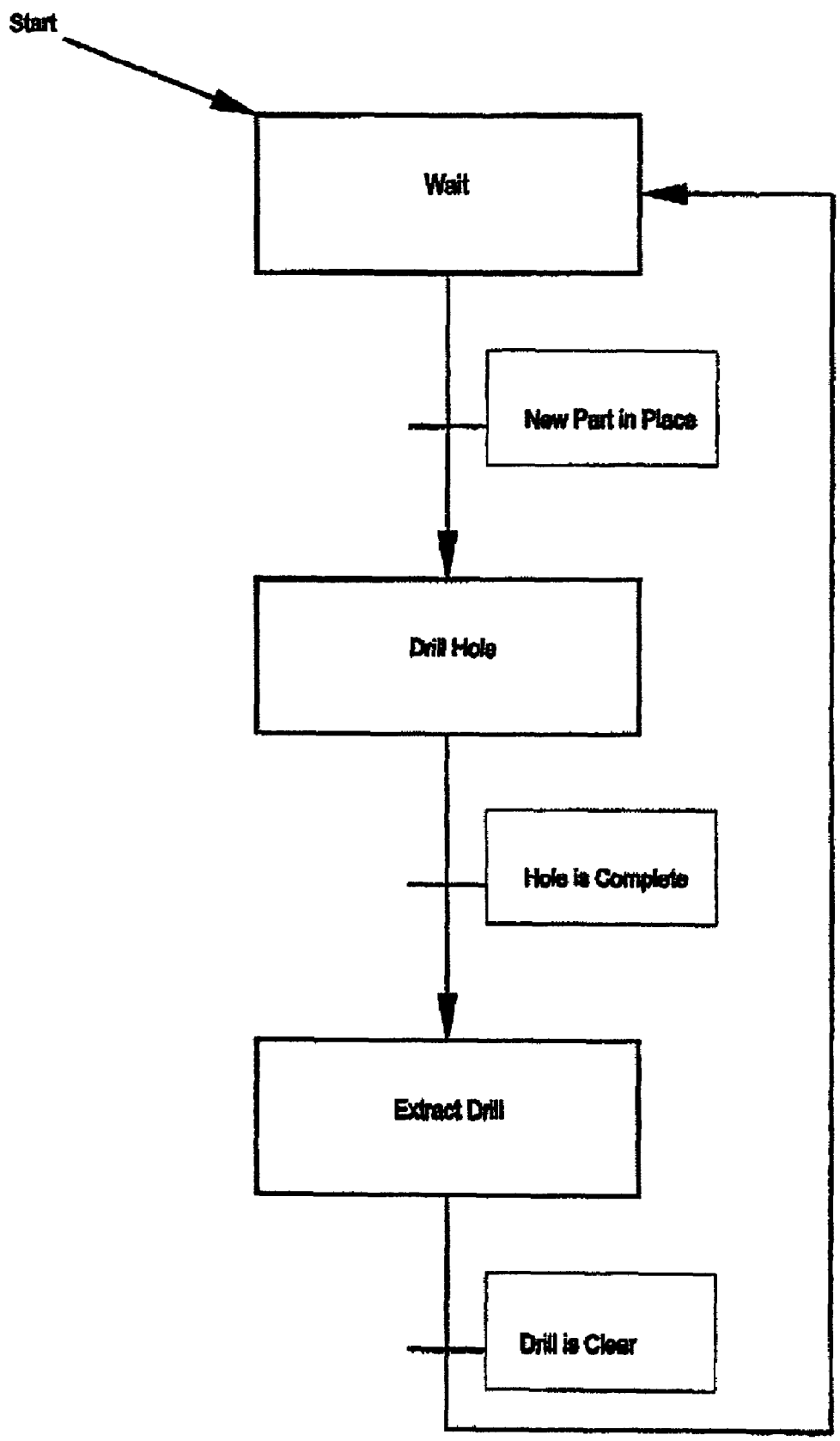
FIG. 3 is a diagram illustrating a simple sequence.
Figure 4:
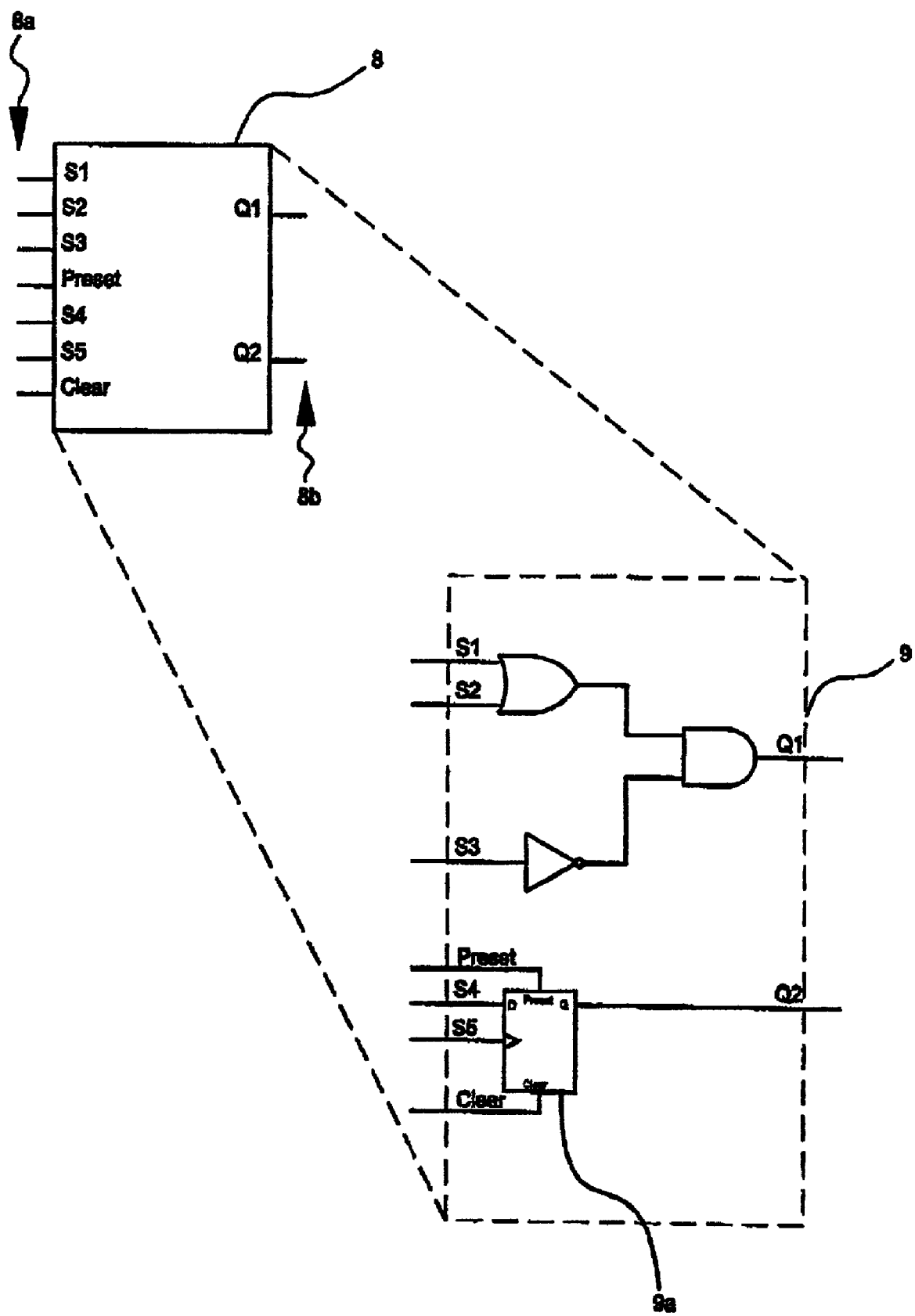
FIG. 4 illustrates the concept of a function block with a detailed circuit hidden within it.
Figure 5:
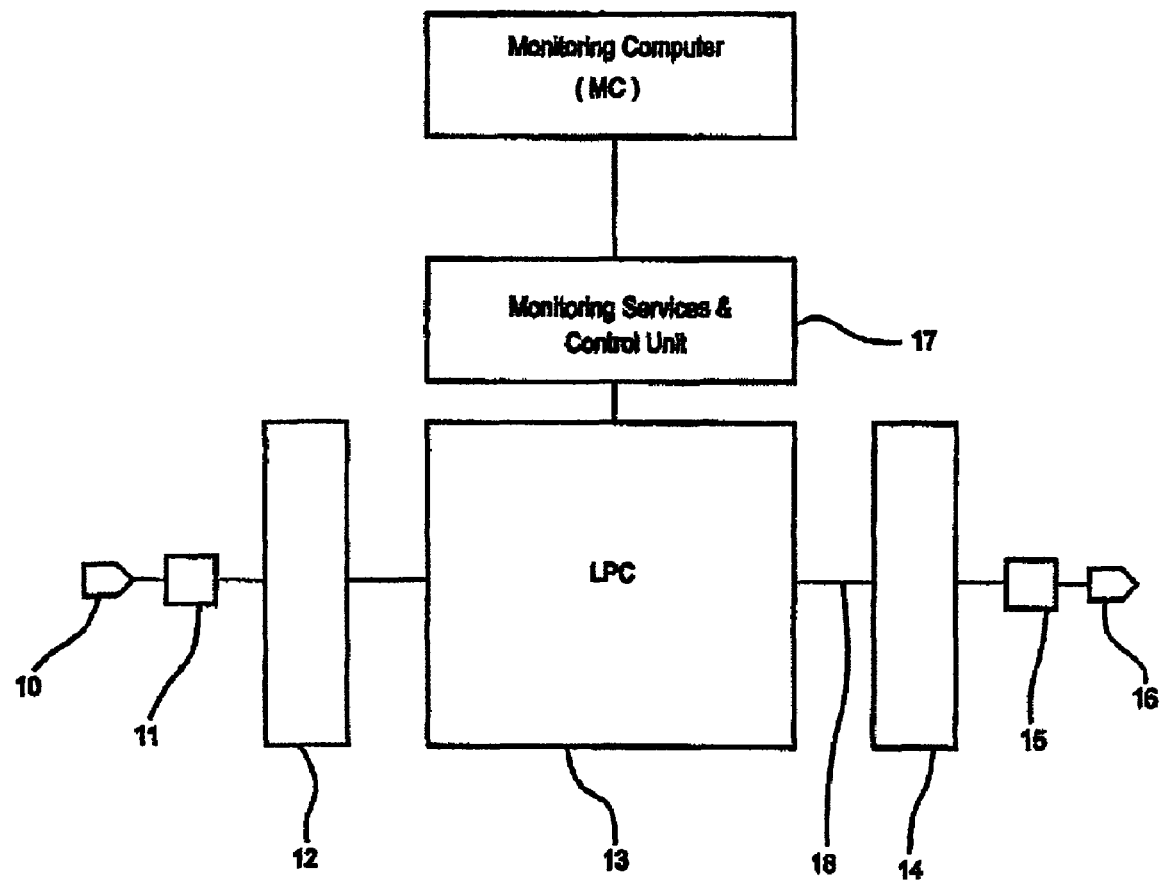
FIG. 5 shows a block diagram of the invention with a monitoring computer attached.

A simplified block diagram of the new Programmable Controller architecture is shown in FIG. 5. Input values are read via input terminals 10 and interface circuits 11, of which only one set of many is shown. These values are sampled and stored in the input registers 12, and processed by the LPC 13. The LPC output values 18 are sampled and stored by the output registers 14 and transferred to the system output terminals 16 via the interface circuits 15. Only one of many output terminal and interface circuit pairs is shown. The Monitoring Services and Control Unit 17 provides services required by the LPC and MC, and control and clock signals for the Programmable Controller system.

Figure 6:
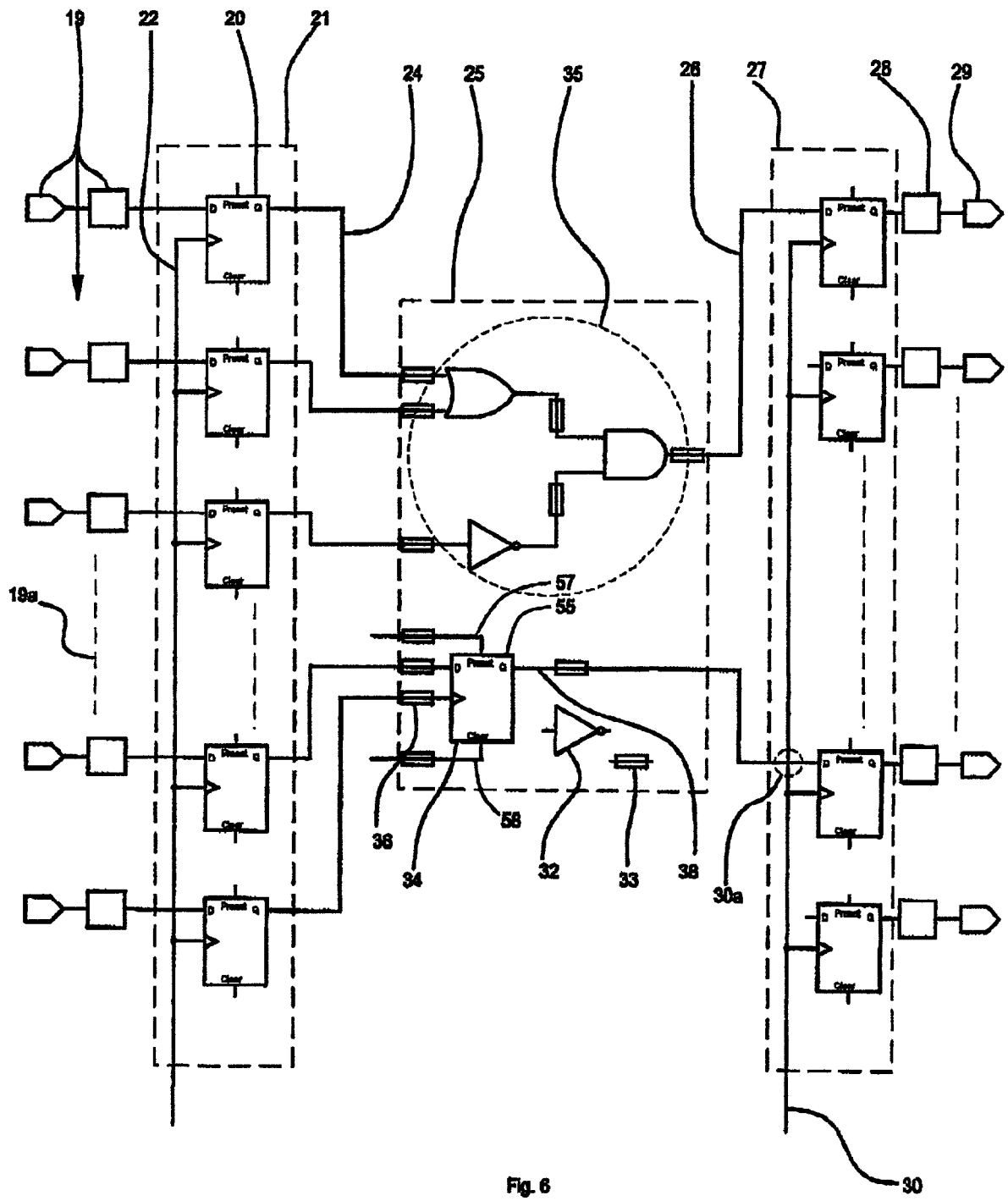
FIG. 6 to FIG. 13 show detail of the invention. Specifically—

FIG. 6 shows the LPC 25 in a more detailed but still conceptual manner. The LPC is shown containing an example interconnected user control program circuit with logic elements such as the flip-flop 34 interconnected with programmable interconnections such as 36. Uncommitted logic elements 32 and uncommitted interconnections 33 are also shown. In practice, the circuits would contain similar logic elements, but be of greater complexity.

It is one function of the user input interface, and of the user output interface, to provide electrical protection to the programmable logic hardware. The programmable logic hardware is normally implemented with electronic componentry which is not designed to withstand the electrical disturbances and voltage levels associated with signals originating within process plant and/or machinery. The interfaces ensure only the correct operating levels are applied to the programmable logic hardware.

Cycle Timing for Logic Processing

It is desirable to operate the Programmable Controller system logic in a clocked and sequenced manner.

The preferred method of clocked operation eliminates sensitivity to clock skew, propagation delay variations, and requirements for setup and hold times.

The preferred system continuously cycles through a number of well-defined steps that together may be called an LPC scan. In its preferred form, one cycle of the LPC scan consists of the steps of—

1. sampling all input data, including previous output values that are to be fed back, and storing the values,
2. using the stored values as input data for the logic processing circuit, and allowing the circuit to process, and the output data from the circuit settle to a stable value,
3. performing tasks on the LPC required for programmable controller monitoring and control, including data transfer and modification,
4. transferring the output data from the logic circuit and storing the values on the system outputs. Allowing the system outputs to settle before repeating The steps 1 to 4 above can be thought of as a single logic processing cycle.

It may be advantageous to arrange for the time taken for each LPC scan to be maintained at a constant value, or alternatively for each LPC scan to be completed in the minimum time required for the operations involved.

Figure 7:
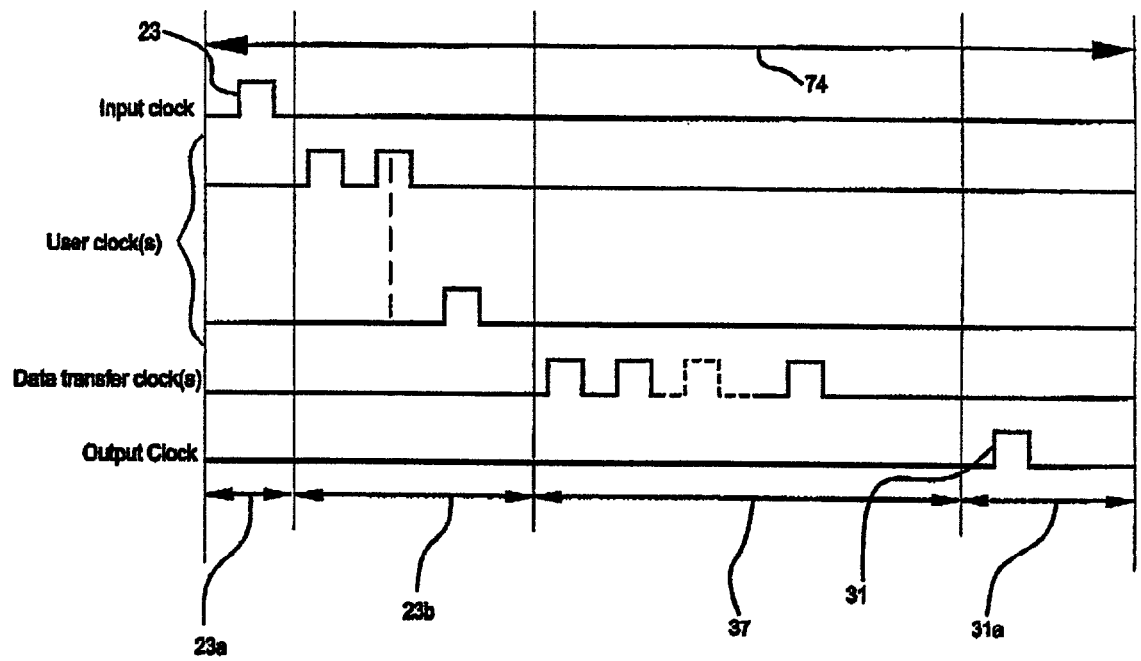

Separate non-coincident clock pulses are provided to time the input and output sample and store operations. These two clock pulses can be combined as one if the clock skew across the whole LPC is small enough to ensure that setup and hold time requirements are always met, and if no clocked operations are required between them. FIG. 7 shows the four basic steps of the LPC scan. FIG. 7 also shows the pulse 23 that samples system input data and the pulse 31 that samples LPC output data.

The double headed arrows in FIG. 7 indicate time intervals delimited by the vertical fine lines at the arrowheads.

The input registers are used to synchronise asynchronous input signals. Setup and hold time violations are implicit in such an operation and will lead to some degree of metastability dependent on the characteristics of the flip-flops performing the synchronisation. The registers must be allowed sufficient time to settle before the values are used, as defined by the associated statistics such that metastability does not represent a significant problem.

Time period 74 represents one whole LPC scan, and is made up of time periods 23a, 23b, 37, and 31a.

An input clock 23, is provided in time period 23a during which input data is sampled and the resulting values are allowed to settle.

Next, one or more clock pulses as convenient are provided in time period 23b for use by the user control program circuit in the LPC. The user control program logic is processed and the resulting values allowed to settle during time period 23b.

Next, data transfer pulses are provided in time period 37, and state data transfers and modifications occur as required for system monitoring. The circuits are again allowed to settle.

Next, during time period 31a, clock pulse 31 is used to transfer output data to the system outputs, which are again allowed to settle.

The delays between the various clock pulses are arranged to allow for satisfactory settling of the logic prior to the next clock pulse.

Processing a large user control program through one cycle using the hardware means described can be completed in sub-microsecond times. This compares to times in the order of a millisecond using software-based techniques.

FIG. 6 provides a more detailed but still simplified circuit of the system, but omits the monitoring services and control section. The isolated vertical dashed lines in the drawing imply the presence of additional similar circuits of the kinds indicated at the line ends. The description will be made in terms of reference numbers applied to individual signal paths through the logic, but it will be readily apparent where there are multiple parallel paths to which the same description applies.

Five input terminal and interface circuit pairs 19 are shown and these direct input signals to the flip-flops 20 forming the input registers 21. Clock pulses on the input clock line 22 clock the input registers. FIG. 7 shows the timing of the input clock pulse at 23. The outputs 24 from the input registers are passed to the LPC 25, and are used by the user control program logic in the LPC together with internally stored state data to generate LPC outputs 26. The LPC outputs are fed via the output registers 27 to the output interface circuits 28 and thence to the system output terminals 29. A pulse on the output clock line 30 clocks the output registers at a time indicated in FIG. 7 at 31.

Providing the Logic Processing Circuit

The LPC is provided by use of a Programmable Logic Device (PLD). The PLD is loaded with a bit pattern representing the settings for the configuration switches required to configure the user control program circuit in the PLD.

The bit pattern can be conveniently generated using a control program development system similar to a PLD development system. The user control program is entered into the development system and a bit pattern generated from it. The development system can be used to download the bit pattern either directly into the PLD or via an attached configuration system.

The user control program may be in the form of a diagram consisting of logic elements, function blocks, etc. The function blocks may be provided to the user as a library.

Logic diagram templates, similar in principle to word-processing templates, may be provided. The templates may have pre-placed logic elements and function blocks for items commonly required in the user circuits and may be used to include the input and output registers 12 & 14, and the monitoring services and control unit 17 in the same PLD as the LPC 13.

Logic Equivalence

It should be noted that the logical equivalent of a ladder diagram, logic diagram, logic equation, sequence control or function block, or a combination of one or more of these forms of user control program can be expressed using a Hardware Description Language such as VHDL or Verilog.

A Hardware Description Language such as VHDL or Verilog, preferably supported by graphical design entry, is also an efficient means of design input to a computer aided design system designed to generate PLD bit patterns defining a circuit of logic elements. Graphical design entry normally supports at least gate networks and function blocks directly.

The point is made to emphasise the underlying logical equivalence of the various design input methods and to show that the choice of which method to use is one of practical convenience, ease of comprehension or personal preference.

State Data and Implications

State data is data stored internally within a circuit from one cycle of operation of the circuit to the next where the circuit is such that the outputs from clock pulse to clock pulse depend on the values stored as well as the inputs to the circuit. State data may be as simple as a bit stored on a flip-flop as at 34, or as complex as an array of records stored in a memory.

The LPC can be said to consist of two types of circuit, namely circuits that do and do not store state data, which we will refer to as Storage Circuits (SCs) as at 34 and Non Storage Circuits (NSCs) as contained in the dashed circle 35 respectively.

Data input to NSCs totally define the NSC state once all signals have propagated and the circuit has settled. Circuits containing only logic gates are NSCs unless connected with feedback to form flip-flops.

An NSC can therefore be reconfigured between one logic processing cycle and the next during time period 37, and the circuit will continue to operate as defined by the current inputs and circuit logic alone.

On first powering-up, SCs may initialise state data form internally defined values. From then on, the changes that occur in the internal and output signals of an SC depend from clock cycle to clock cycle on both the inputs and the stored state data as at 38. Future operation is dependent on history.

A simple practical example of such internal state data is the value stored in a timer function block that represents the time since the timer was commanded to start timing. Another example is the value identifying the active state in a state machine function block.

SCs may also be reconfigured during time period 37 and will continue to operate predictably providing proper steps are taken to ensure that the reconfigured SC is also loaded with the correct and necessary state data.

It should also be noted that a function block may be designed in such a way that not all of the state data in it need be loaded as discussed.

For example, a function block might provide complex calculation facilities, with input values including details of the calculations required being provided as inputs. The function block can read the inputs, perform the calculations and post the answer accompanied by a flag to indicate that the answer may be read. At this point, any intermediate values used in the calculation are irrelevant and may be discarded, and the associated state data values do not need reinstating during reconfiguration.

The same intermediate state data values can be ignored, if the LPC reconfiguration occurs during the calculation, by preserving and modifying the state data values at the function block interface in such a way that the calculation is repeated from the beginning and is based on the original input data. This may be handled by having the MC automatically modify a function block flag during reconfiguration based on data from the function block library.

System Monitoring

The invention makes provision for all of the normal programmable controller system monitoring functions. Specifically, the invention provides for the functionality needed in a programmable controller to allow an external MC that can perform the required data processing to provide services including—

Editing, loading, starting, pausing, resuming and stopping a program. Program editing and loading are operative during run-time.

Reading, displaying, modifying and forcing data and I/O values

Error handling.

To those skilled in the art, it will be readily apparent from the description in this specification how a user control program can be started, paused, resumed and stopped. Other than saying that these functions may be implemented by suitable logic, sequencing and control of the various system clocks, no further comment will be made. The other aspects will now be dealt with.

Program Editing During Run-Time

It is advantageous when commissioning machinery or processes to be able to edit and modify the operative user control program while continuing to maintain proper control. The present invention allows for that eventuality.

Where the required response speed of the Programmable Controller is slow enough, a program may be modified during run-time between one logic processing cycle and the next during time period 37 as follows— the state data is unloaded from the LPC,
the new circuit is configured in the LPC,
the state data is reloaded into the user control program storage elements corresponding to those from which it was read, with adjustments as necessary, and the modification is then complete, ready for the next logic processing cycle to begin. The monitoring services and control unit manages the operation in conjunction with the MC and the state data may be temporarily stored in the MC.

Editing Terminology

The process of switching from one user control program to the other will be referred to as a 'program swap' or 'program swapping'.

Program swapping involves stopping the program currently running, loading a new program, and managing the whole process so as to cause the minimum disruption to the plant being controlled, the whole process being completed as quickly as possible. Program swapping is the process used to edit and make changes to a program while it, to all intents and purposes, continues to run.

It is also useful to refer to introducing changes while maintaining control as 'editing a running program'. That is how the process appears from the user's perspective, even though it actually consists of terminating one program and loading another.

The terms 'incoming' and 'outgoing' will be used in the context of program swapping in the sense, for example, that an incoming entity is one that replaces an outgoing entity of the same kind. Typical entities referred to may be programs, state data values, circuits configured in LPCs, etc.

Speeding Up Program Swaps

A faster program swap can be provided using two LPCs, instead of one, arranged so that they may be selectively coupled to the input and output registers. The LPCs may be provided in two separate PLDs, or in two separately configurable sections of the same PLD as is most convenient.

Figure 8:
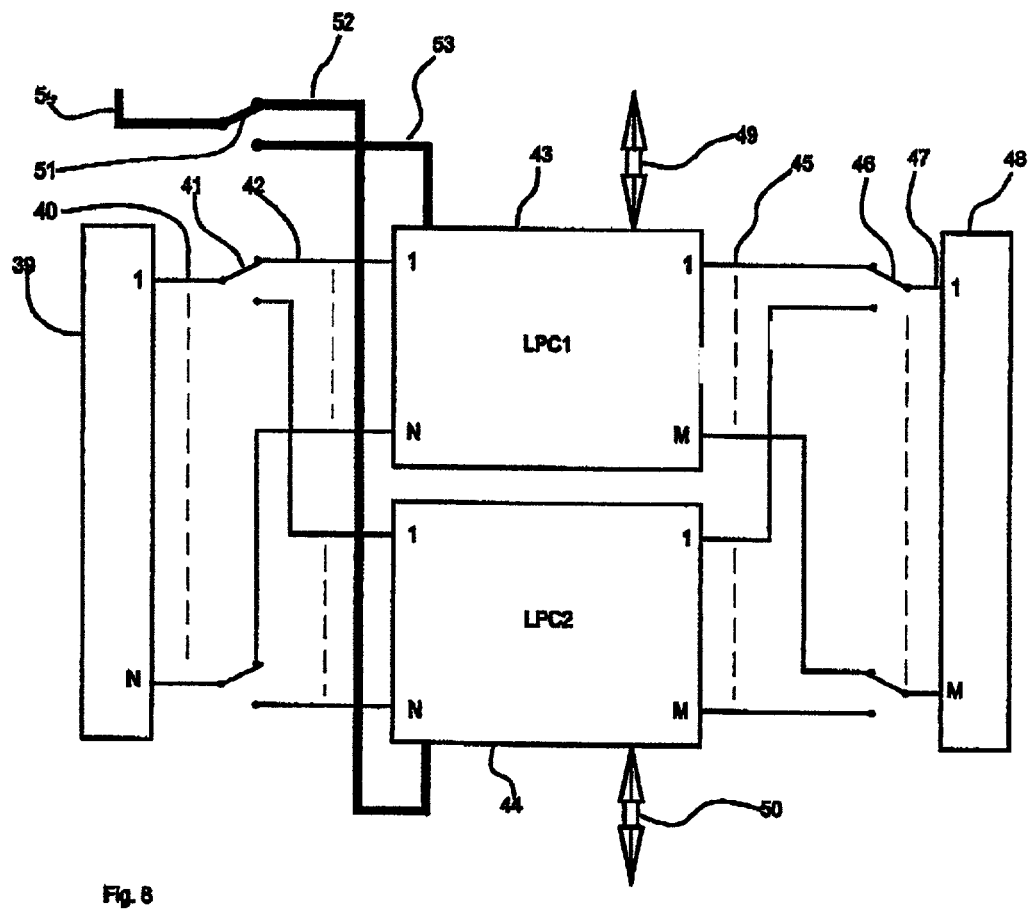

FIG. 8 shows such an arrangement. Input registers 39 deliver sampled and stored input signals 40 via switches 41 to LPC inputs 42 either to LPC1 43 or LPC2 44 depending on the position of the switches. LPC outputs 45 are similarly delivered to the output registers 48 via switches 46 and register inputs 47.

With the switches 41, 46, 51 etc. in the positions shown LPC1 is the operative logic processing circuit. LPC2 is available for configuration via the configuration bus 52, 54. The configuration bus 53 into LPC1 is disconnected. All of the switches shown in FIG. 8 are coupled so that they are either all in the position shown, or all in the opposite position. In the opposite position, LPC2 is the operative logic processing circuit and LPC1 is available for configuration.

It should be noted that the purpose of the switches 41 etc, on the LPC inputs is just to allow disconnection during LPC configuration. If the LPC implementation is such that the inputs may be left connected during configuration without malfunction, then switches 41 etc. may be eliminated, and permanent connections made in parallel to both LPCs. Further discussion will assume this latter arrangement.

FIG. 8 also shows means for transferring data 49 and 50, from LPC1 and LPC2 respectively to the MC via the monitoring services and control unit 17 in FIG. 5, as required to implement system monitoring functions.

It will be readily apparent to those skilled in the art that the switches 41, 46, and 51 etc. may be of various types or semiconductor steering logic.

The use of two LPCs allows the incoming LPC to be loaded with a bit pattern at leisure prior to completing the last logic processing cycle in the outgoing LPC, rather than between the last outgoing LPC logic processing cycle and first incoming LPC logic processing cycle. This reduces the program swap time.

By using two LPCs, while the first LPC is operating, the user may edit the user control program logic diagram, generate a new bit pattern and load the new bit pattern into the second LPC. Once the new configuration is loaded, the second LPC may be coupled to the input and output registers, and at the same time, the previously operative LPC can be decoupled.

In general, the program swap process can be completed in the minimum time by performing all necessary processes such as bit pattern and relocation table compilation prior to the last logic processing cycle of the outgoing LPC. Improvements in swap times can also be obtained by using special purpose hardware assistance for such processes as reloading relocated state data values as opposed to relying on the general purpose processing of the MC.

The program swap process will now be discussed in more detail. This will be with reference to the double LPC method unless noted, but it will be easily seen that the same principles apply to the single LPC method.

Managing State Data

Before a new user control program that has been configured in an LPC can operate correctly, the state data values must be initialised. This is normally done as part of the design of the program and function blocks, including the provision of initial values, and may be initiated by a power-on reset.

When an SC is reconfigured, the user who implements the circuit configuration must also initialise circuit state data in such a way as to ensure proper ongoing operation. When a running program is modified, the user must decide whether each function block continues to operate using any existing state data it may have, or whether changes to the state data are required for proper future operation. The same comments apply to other storage circuits.

For example, in parts of the program that have not been altered by editing, it may well be logical to continue with the existing state data. If a new function block has been added to the program, there will be no previous state values existing, and any state data used by it must be initialised. If an existing function block, or the circuit around it, is altered then function block state data may need adjustment.

The determining factor is the user's knowledge of how the circuit will function with different state data values. The user must consider both the requirements of the user control program circuit and the process under control.

Program Swap Sequence

When the user program has been modified, and the LPC bit pattern has been re-compiled, a single LPC program swap may be sequenced as follows—
1. The last cycle of the outgoing LPC scan is terminated at the beginning of time period 37 in the LPC scan.
2. State data is read out of the outgoing LPC.
3. The new configuration bit pattern is written into the LPC.
4. Suitably relocated and modified state data is written into the LPC
5. The first cycle of operation of the incoming LPC is started at the end of time period 37 in the LPC scan.

A program swap using two LPCs may be sequenced as follows—
1. The new configuration bit pattern is written into the incoming LPC.
2. The last cycle of the outgoing LPC scan is terminated at the beginning of time period 37 in the LPC scan.
3. State data is read out of the outgoing LPC
4. Suitably relocated and modified state data is written into the incoming LPC.
5. The outgoing LPC is decoupled from the output registers.
6. The incoming LPC is coupled to the output registers.
7. The first cycle of operation of the incoming LPC is started at the end of time period 37 in the LPC scan. The details of the processes required and the meaning of "suitably relocated and modified state data" will be discussed next.

Reading and Writing State Data

To facilitate managing state data values, a mechanism is provided allowing the reading and writing of state data values from outside the LPC.

The mechanism may be provided as part of the SCs that use state data, or be a built-in part of the PLD within which the LPC is configured.

FIG. 6 shows a flip-flop 55 that can store one bit of state data. Access to the Q 38, Preset 57, and Clear 58 connections allows the flip-flop state to be read and set to true or false values by devices outside the LPC. Application of the method to a large number of state bits would require an unmanageable number of discrete connections to the LPC, and so an alternative method may be desirable.

Configured Means of Access

Figure 9:
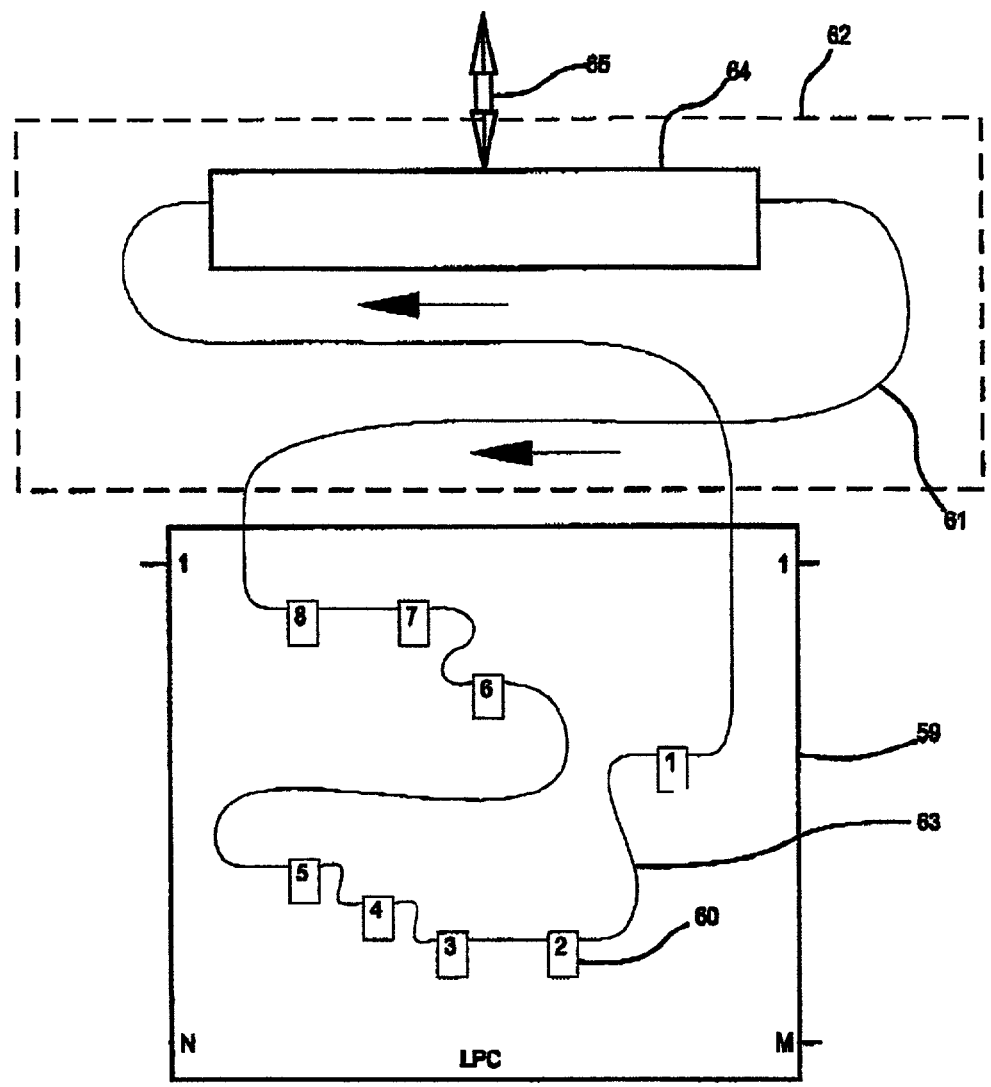

FIG. 9 shows an example of a single LPC 59 arranged to exchange data with an external circuit 62. It is arranged that all of the flip-flops as at 60, configured in the LPC user control program circuit, are interconnected as at 63 to form a shift register. The flip-flops, as at 60, within the LPC are numbered "1" to "8" to show their position in the shift register. The data in any flip-flop may be accessed by shifting it out of the LPC. The number of shift pulses required is calculated from the flip-flop number. The flip-flop number therefore functions as an address.

The external circuit 62 also contains a shift register 64 of a convenient length, and the whole is connected into an endless loop shift register 61. The solid headed arrows in FIG. 9 indicate the direction of data shifting in the shift register loop shown.

Shift register 64 is of the type that can be read and loaded via parallel connections 65, thereby exchanging data with the MC, memory devices or other circuits as required.

A shift clock, not shown, is connected to all of the elements in the endless loop shift register. If there are K stages in the endless loop shift register, then K cycles of the shift clock will shift the data completely round the loop and back into its original position. During this shift round the loop, the data may be read externally via the parallel connections 65, and if desired, it may be modified via the parallel connections 65. Thus with K shift clock cycles all of the LPC state data may be read, modified and rewritten as desired. The K cycles are arranged to come in the time period 37 in FIG. 7.

We will refer to the K cycles of the shift clock as an 'address rotation', meaning that one address rotation allows access to all the data in the shift register. The same terminology will be used later in association with random memory accesses also meaning that one address rotation allows access to all the data in the memory.

It will be readily apparent that if K cycles represent an undesirably long time, that the system can be arranged to have multiple parallel shorter endless loop shift registers. It will also be readily apparent that each of the data bits may be arranged to be accessed using standard random access memory techniques, but such techniques may not always be efficient or convenient.

Figure 10:
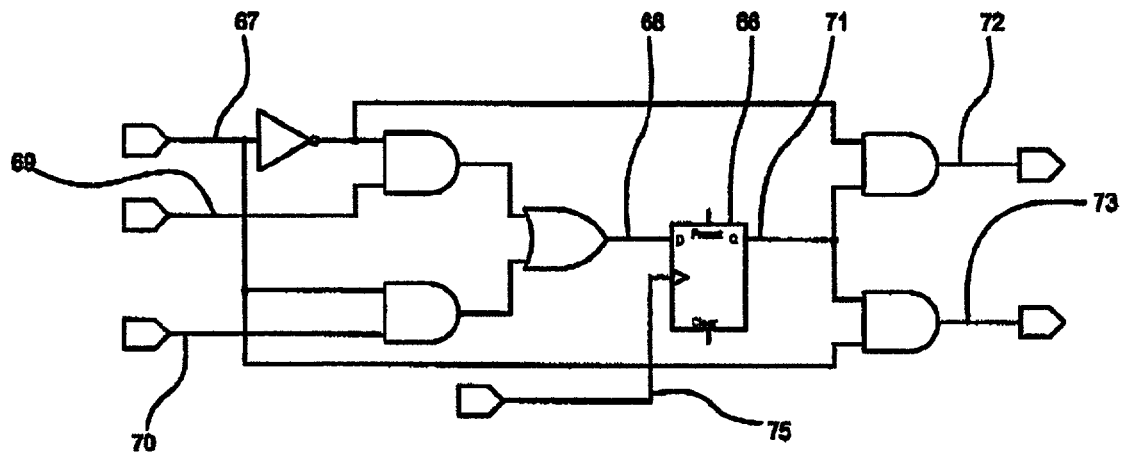

To allow the LPC flip-flops 60 to function both as user circuit devices and as part of the endless loop shift register 61, support circuits are provided. FIG. 10 shows such a support circuit. The support circuit for the flip-flop 66 works as follows.

A select signal 67 is provided that when false will connect the shift data input 69 to the flip-flop data input 68, and also connect the data output 71 to shift data output 72. When true, signal 67 will connect the logic data input 70 to the data input 68 and also connect the data output 71 to logic data output 73. The select signal 67 may be arranged to be switched false during time period 37 in FIG. 7, allowing the shifting of data for reading and writing. The select signal 67 may be arranged to be switched true during the remainder of the LPC scan 74 in FIG. 7, allowing the flip-flop 66 to function as part of the LPC user control program circuit.

The application of the support circuit in FIG. 10 around the flip-flop 66 imposes some restrictions on how the flip-flop may be used in the user control program circuit, but the restrictions are of minor significance only. For example, one restriction is the need to steer shift and logic clock pulses to the clock input 75 at the appropriate times. For example also, a second restriction is the need to ensure that the user control program circuit can properly handle the transitions that will occur on the logic data output 73 when the select signal switches while the flip-flop output 71 is true.

Built-in Means of Access

A PLD may be provided with built-in circuits to support access during operation to state data stored in the user accessible flip-flops it contains.

Such access may either be provided via a shift register arrangement as discussed for use with SCs, or via a random access memory arrangement allowing the user to provide an address to select data and to read or write the data selected as one or more bits.

This invention can use such an arrangement for reading and writing state data as an alternative to the means previously discussed if convenient.

Display and Modification of State Data for System Monitoring

The MC can display state data with minimum interruption of the operation of the LPC by initiating the rapid copying of some or all of the state data into a memory external to the LPC during time period 37. The MC may then display the data in the memory at its leisure. Self-updating displays may be implemented with minimum interruption of the operation of the LPC by periodically initiating the copying of the LPC data into the memory.

It is a function of the MC to understand the correspondence between the state data addresses and the function of the state data within the user control program circuit. This correspondence data is generated as part of the design of the function blocks provided by the Programmable Controller supplier to the user, and may be provided in part as an address relative to the first state data address used by the function block concerned. As each function block is developed, the addresses of all the state data within the function blocks can be determined relative to the first bit of state data compiled. The MC uses the correspondence data to facilitate the presentation of the state data in a user-friendly manner.

By way of example, the correspondence data may define that the count value held in a counter appears in state data bits 10 to 25 relative to the first state data bit in that type of function block. The first bit allocated by the circuit compiler to that function block may be bit 253. The count bits will then be bits 263 to 278. The control program development system may also provide information naming the function block as per the user control program circuit. The MC may then display on request the name of the function block and its associated count value in a way that is easily understood. Similarly, the MC may be enabled to display only the state data that is meaningful to the user and to ensure user modification of state data is well controlled and legitimate. Display of state data that is only relevant to the internal workings of a function block can be restricted and modification of such state data can be automatically managed to ensure proper operation. The determination of which state data requires reloading after reconfiguration can be handled in the same way.

It is envisaged that the control program development system and function block library may provide information associating the function block with software objects designed to provide the necessary software support.

Modifying state data requires special care if it is only possible to transfer LPC state data in unstructured blocks such as occurs with a shift register arrangement, instead of transferring just the specific bits or bytes that are to be modified. The whole data block must be read after a logic processing cycle has completed, modified as required by the user, and the whole block written back into the LPC before the next logic processing cycle is started. That is, the operation must be completed within time period 37 in FIG. 7. This method ensures that the only data that changes, as far as processing the user control program circuit is concerned, is the data that the user wishes to modify. The portions of the data that had to be read as part of the block, but were not modified, are written back unchanged. The intermediate changes that occur during data shifting have no effect on the user control program circuit operation providing they all occur during time period 37.

It should be noted that any data bit may require modification while the data bits on one or both sides of it do not. Modification is a bit-by-bit process.

Figure 11:
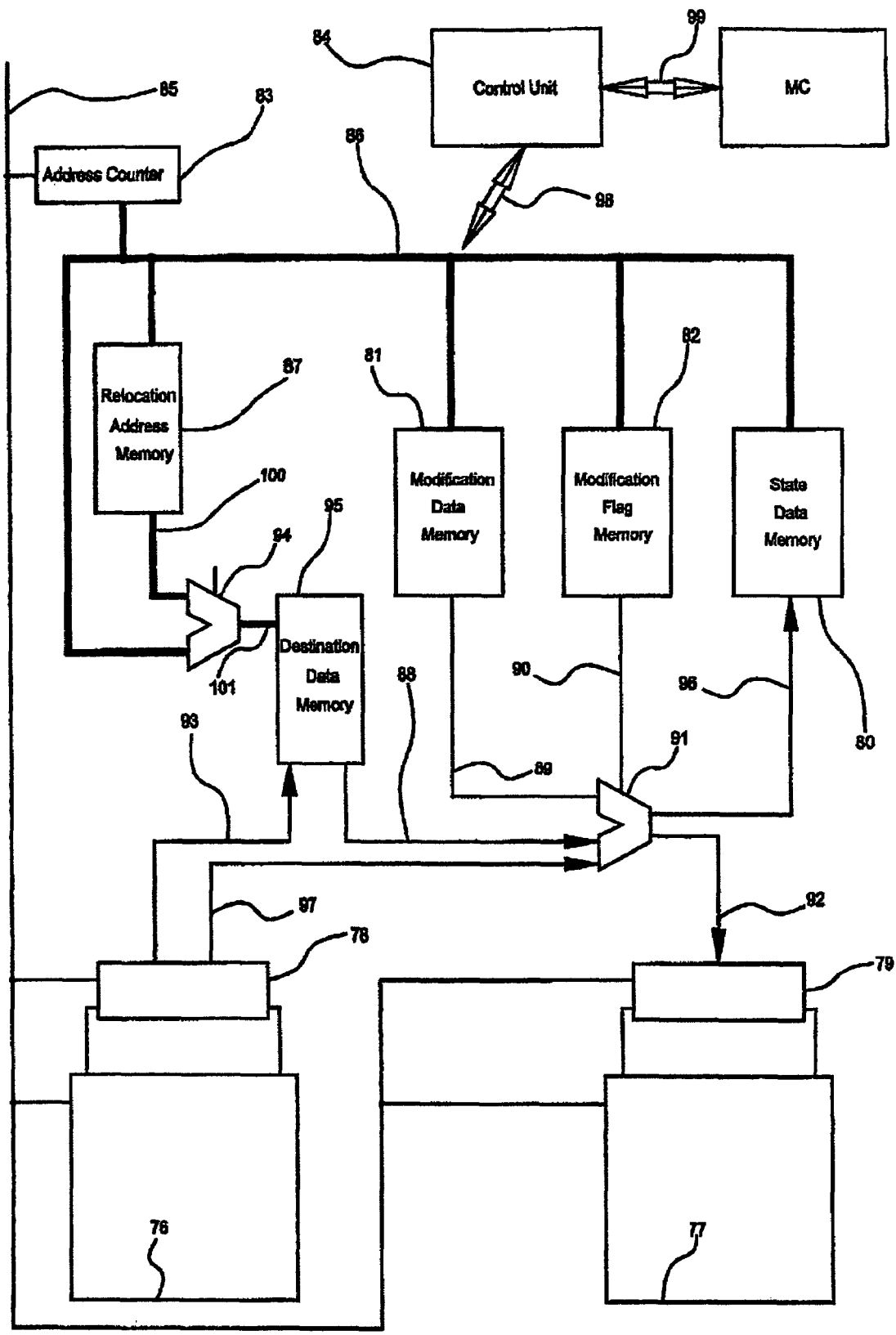

FIG. 11 shows a circuit arrangement in block diagram form suitable for use by an MC in the process of displaying and/or modifying state data.

The arrangement has memories used to facilitate the high speed copying, during which copying, the state data may be modified as required by the user. The data may be copied back to the same LPC it was read from, but for clarity two separate LPCs are shown. A single bit wide data path is shown for clarity, but wider data paths, for example 8 bits or 16 bits, may be used to advantage as long as arranged to modify the data bit-by-bit. The functionality required to locate state data in the receiving LPC in a different position to that occupied in the source LPC is also shown, and is discussed later.

The control unit 84 under command of the MC sequences and steers the data transfers in a conventional manner via data and control paths 98 and 99. The arrows 88, 92, 93, 96, 97 are paths along which data flows at times appropriate to specific transfers and should not be interpreted as permanent connections.

The arrangement shows LPCs 76 and 77 with shift registers 78 and 79 connected in the manner of FIG. 9. It will also be readily apparent to those skilled in the art how the state data bits may be accessed using standard random access memory techniques. It should be noted that address references to state data locations may be in terms of the position of the data in a shift register, as shown in FIG. 9, or in terms of a memory address if random access memory addressing techniques are used to access the data.

The memories are arranged so that memory 81 holds new values to be optionally applied as modifications to the data during copying. Memory 82 holds data representing an array of flags indicating which state data bits require the optional modification and which do not. Memory 80 stores data that has been read and has had the modifications optionally applied.

Clock pulses applied to clock line 85 shift data out of and into the LPCs, and also generate addresses on address bus 86 via the address counter 83. The whole is arranged so that the bit of state data shifted out of the first flip-flop in LPC 76 corresponds to the optionally modified data written into the first memory location in memory 80 and/or the first data bit written into shift register 79. The first data bit written into shift register 79 is ultimately shifted into the first flip-flop in LPC 77. Modifications are made in the same operation. The first bit of modification data stored in memory 81 is output onto line 89, and the first modification flag stored in memory

82 is output onto line 90. The polarity of the modification flag is such that, if a modification is required, the data bit on line 89 is multiplexed onto paths 92 and/or 96 by multiplexer 91, otherwise the data on line 97 is multiplexed onto paths 92 and/or 96.

Each modification flag is reset when the associated modification has been applied to the state data.

In this way, with suitable sequencing and steering logic, various data transfers may be made between LPC scans in period 37 as shown—

1. Data maybe placed in the modification memory by the MC via the control 84, and copied to an LPC. An LPC may be totally re-written by this method.
2. Data may be copied from one LPC to the same or another LPC and optionally modified during copying.
3. Data may be copied from an LPC into the state data memory 80. The MC may access the data at leisure later via the control 84 and display it to the user.

For example in the case of copying and modifying data, the control unit 84 controls the number of shift clock pulses generated. Enough pulses are applied to shift the state data in LPC 76 into the shift register 78 and back into LPC 76 in its original position. The number amounts to one address rotation. The same clock pulses cause a complete rotation of the data in the endless shift loop of LPC 77 and shift register 79, during which the new values appearing via path 92 are written in. The optionally modified first bit in the LPC 76 shift loop is written into the first position of the LPC 77 shift loop, the second bit into the second position, and so on until all the required data is transferred.

The memories and support circuits described may be provided internally within the same PLD used for the LPC, or as a separate device or devices within the programmable controller or as a function within the MC. The choice in any one case will depend on the trade-offs required between Programmable Controller functionality, cost and speed of operation.

Forcing State Data

Forcing state data is the process of holding some or all of the user control program state data at a defined fixed value in such a way that the user control program cannot alter it. Forcing may be used, for example, to hold a counter at some predetermined value, even though count pulses are present.

Forcing may be provided by running the data modification process each LPC scan the forcing is required. Doing so ensures that the state data concerned is in the same known state when the user control program is processed and allowed to settle.

With normal modifications, the data modification flags are reset as part of applying the modifications, and the user control program circuit is free to operate on the new values during the next LPC scan. That is, the modifications are applied only once, and the values may change from scan to scan. However, if the same modifications are applied each LPC scan, the state data values modified are effectively forced to remain at the modified values.

To facilitate forcing, the modification flag memory 82 may be provided with two flag bits per bit of state data. One flag bit indicates whether a modification is to be made, and the other whether the state data bit is required to be forced. The value for modification or forcing is held in the modification data memory 81. In addition, control unit 84 may have a flag to indicate whether any state data at all is forced, so that the data modification process may be run to apply the forcing if required, but skipped if neither forcing nor normal modification is required.

During normal modification of a state data bit, which is when the appropriate forcing flag in the modification flag memory 82 is false, once the new value is applied the appropriate modification flag is reset. During modification as part of forcing, which is when the forcing flag is true, when the value is applied the modification flag is not reset.

By these means, referring to the forcing flag in the control unit allows the control unit to start a modification process when required. The forcing flags in the modification flag memory 82 allow the appropriate state data bits to be forced.

Forcing I/O Data

It is also anticipated that the control unit 84 will provide facilities to force I/O data, but provision of such facilities is a straight forward matter.

Copying, Initialising and Adjusting State Data During a Program Swap

During a program swap, state data values from the outgoing LPC are loaded into the incoming LPC modified in value as deemed appropriate by the user. Values for previously non-existent SCs are initialised.

When state data is copied from the outgoing LPC to the incoming LPC during a program swap, it is essential that data read from a specific outgoing user control program state data bit is written into the corresponding incoming user control program state data bit.

During a program swap, the corresponding incoming user control program state data bit may well be at a different location and therefore have a different address to the outgoing bit. State data transfers during other operations do not usually have that problem.

Relocation of State Data

Relocating state data requires the ability to copy the data bit by bit and place it at a defined destination location optionally different to the source location. No defined relationship can be assumed between the source and destination locations of any bit, or between the destination location of one bit and the destination location of the next, other than as defined by the MC controlling the operation. The locations result from incoming and outgoing user circuit interconnects and/or compilations.

It is a function of the MC to provide cross-reference information for each state data bit specifying the source and destination applicable.

FIG. 11 shows an arrangement for relocating state data during its transfer from one LPC to another. The arrangement is intended to provide high speed transfer and minimise the time required during the data transfer stage 37 of the LPC scan. Arrows 88, 92, 93, 96, 97, represent data transfers performed at different times, rather than simple connections.

The copy with relocation operation is performed as follows. Initially, the MC, via the control unit 84, loads relocation data into the relocation address memory 87. If, for example, source address 123 corresponds to destination address 654, then a value of 654 is loaded at address 123 in the relocation address memory 87. The process is repeated until all locations in the relocation table memory, corresponding to data to be copied from the LPC 76, have an appropriate stored destination address value. The relocation addresses are loaded at leisure by the MC via the control unit 84 outside of the data transfer stage 37 of the LPC scan. The modification data memory and the modification flag memory are loaded as required, also outside of the data transfer stage 37 of the LPC scan. The incoming LPC is reconfigured outside of the data transfer stage 37 of the LPC scan as part of the program swap procedure.

The actual state data transfer is performed during period 37 of the LPC scan. The process has two parts.

Firstly, a first address rotation of the address counter is used and data is shifted out of LPC 76 via shift register 78 and stored in memory 95. The addresses for the destination data memory 95 are provided by the relocation address memory 87. Hence, using our example above, access to address 123 in LPC 76 will also access address 123 in the relocation address memory 87. This will generate an output on bus 100 of a value 654, the value stored in the relocation address memory at address 123. This value is delivered to the destination data memory address bus 101 by multiplexer 94 under the control of the control unit. The multiplexer 94 selects bus 100 as the source for bus 101 during the first address rotation. The result is that the state data bit originating at the location 123 in LPC 76 is stored at location 654 in destination data memory 95, and is relocated as required for the program swap. Each state data bit in LPC 76 is similarly transferred and relocated into destination data memory 95.

Secondly, a second address rotation of the address counter is used and the relocated state data is transferred from the destination data memory to LPC 77. The state data is modified as required using the techniques previously discussed based on the contents of the modification data memory and the modification flag memory. Multiplexer 94 selects address bus 86 as the source for bus 101 during the second address rotation.

In the way described state data from LPC 76 is copied into LPC 77. During the copying, the data is relocated and modified as determined by the contents of the modification data memory 81, the modification flag memory 82, and the relocation table memory 87 provided by the MC via the control unit 84. It is a function of the MC via the control unit 84 to arrange the loading of suitable values. It is also a function of the MC via the control unit 84 to arrange the number of counts making up each rotation of the address counter and controlling the data shifting process. This information is generated on the MC during the program preparation process.

It should be noted that in general the size of the incoming and outgoing user control program circuits will be different due to program modifications made. Data from LPC 76 may be relocated outside the address range applicable to the program in LPC 76 if the incoming program is larger. Data in the modification memory will augment the state data in the destination data memory if the incoming program is larger. Some outgoing state data may be irrelevant and may be discarded by, for example, being written to an address outside the range of the incoming program. Due to the difference in sizes, the first and second address rotations will consist of different numbers of pulses. It is anticipated that all control data for the first and second rotations will be loaded into the control unit as required prior to the initiation of the program swap, and that the program swap will complete, once initiated, without further involvement of the MC.

FIG. 11 illustrates an arrangement with single bit wide data paths. It will be easily seen that data may be handled in a byte-wide or 16 bit wide manner by the use of multiple relocation table memories 87 and multiple bit-wide destination data memories 95.

Resumption After a Power Outage

The system may be arranged to retain state data across power outages when power is lost to the LPC.

The critical requirements being—
1. Firstly, as power is lost, a properly managed shutdown performed by control unit 84 must ensure that all SC state data is properly stored in a battery backed-up memory or similar secure store.
2. Secondly, on re-powering after a power outage, the program bit pattern (if lost due to the power outage) and the state data must be reloaded.

These two steps together with a properly managed cessation and initiation of normal logic processing cycles will enable the user control program to continue from the point where power was lost.

It must be noted that it is the user's responsibility to ensure, that the complete combined state of the controller and the process under control, enable such a continuance to be safely carried out.

Examination of FIG. 11 will show several memories that may be used for backup by the control unit 84, and it is a simple matter to make such arrangements.

Failure Detection and Correction

It is desirable to detect and correct control system failures in systems controlling process plant and machinery.

In the current art this is done by means ranging from watchdog timers that monitor correct processor operation to systems with redundant processors and voting comparators that detect when, for example, one out of three systems deviates from the other two.

The present invention can be arranged with two LPCs. Both LPCs can be arranged to have identical user control program circuits, and input data and be clocked identically. Any difference in the output data of one LPC compared to the other once stable after clocking, indicates that one or the other has malfunctioned.

The process is essentially the same as that used to test digital circuits during manufacture, in which process device outputs are compared clock by clock with test vectors produced by a known good device or simulation.

Figure 12:
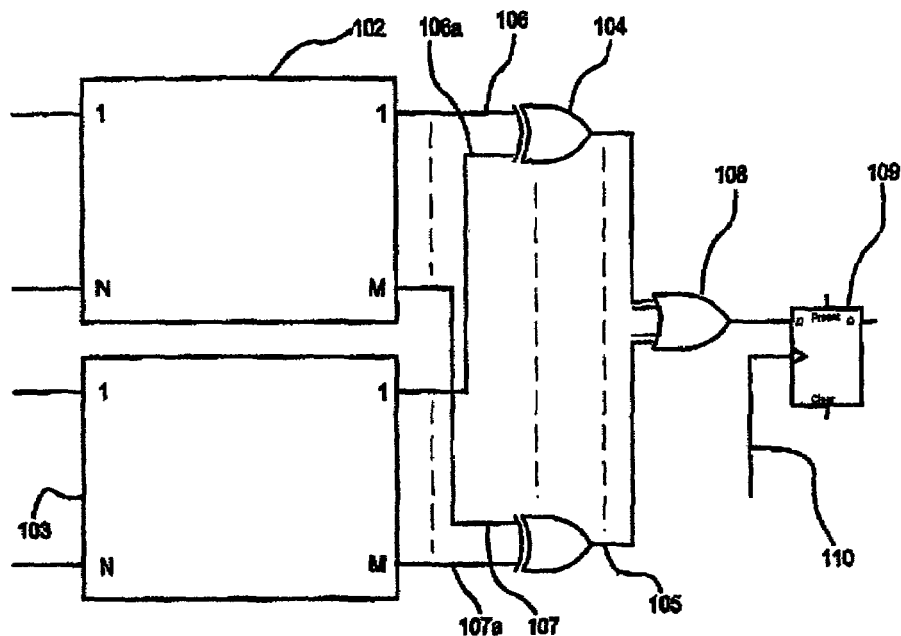

FIG. 12 shows conceptually how this may be done. LPC 102 and LPC 103 are fed in parallel, which is to say that all input signals are applied to them identically. The assumption is made that the two devices will not fail identically on the same clock cycle, and that any difference in outputs between the two devices is indicative of a failure in at least one of them. It is also assumed at this stage of the discussion that the error detecting circuits operate correctly. The LPCs produce output signals numbered 1 through M. Output 106 from LPC 102 is compared with output 106a from LPC 103 using two input XOR gate 104, which will produce an output if the two input signals 106 and 106a differ. All M output signals are compared in a similar manner, through to signal 107 compared to signal 107a in gate 105. If any of the signal pairs display a difference, then the M input OR gate 108 will produce an output indicative of a failure. Clock signal 110, timed to sample the output of the OR gate after it has stabilised, will place a stored true level on the Q output of flip-flop 109 indicative of a failure if such occurs.

Note that only four inputs are shown on the M input OR gate, only two of which are shown connected. The dashed vertical lines imply a series of circuits of the kind shown at the ends of the lines in the space occupied by the lines.

It can be seen that additional LPCs can be added, together with voting circuit to detect the LPC that has failed, and differences in operation can be detected. Once a failed device is detected it can be disabled from driving the control outputs and operation maintained by remaining good devices by enabling those devices to drive the control outputs. Operation can therefore continue without propagation of errors to the outputs.

It should be noted that in systems using multiple LPCs operating in parallel, all LPCs must be fed with inputs from the same sources. In particular, the input register used to synchronise asynchronous input signals must be common to all LPCs. If it is not, clock skew and the setup and hold time violations implicit in synchronising the asynchronous input signals, will at times cause malfunction due to the differing output values register to register.

Figure 13:
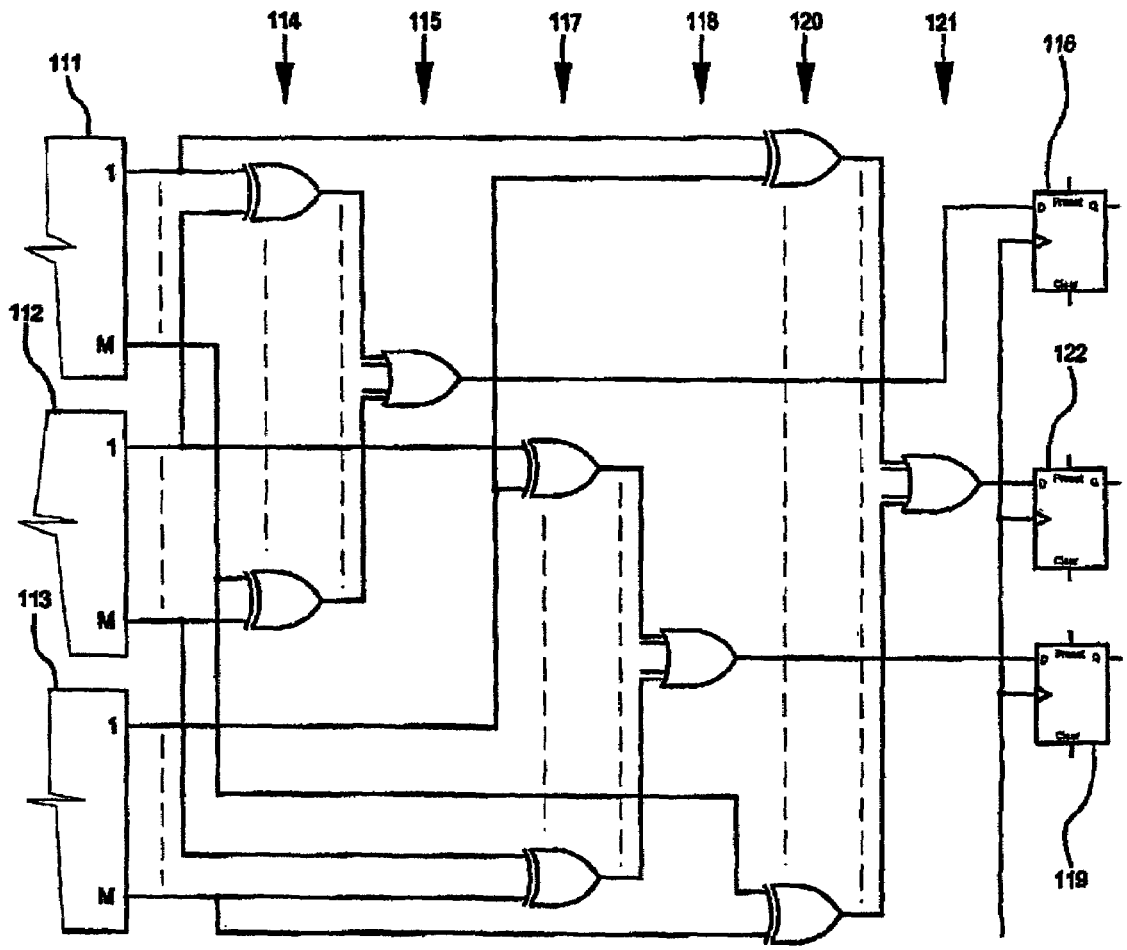

FIG. 13 shows a circuit that can detect failures and determine which out of three devices has failed. It is then a simple matter to continue operation with the two devices that are properly operational until the failure can be corrected.

In FIG. 13, LPCs 111, 112, 113 are partially shown. The M two-input XOR gates in column 114 and the M input OR gate in column 115 compare the two sets of outputs from LPCs 111 and 112, in the manner of the circuit in FIG. 12. The result is stored on flip-flop 116. Similarly, the devices in columns 117 and 118 compare LPCs 112 and 113 and store the result on flip-flop 119. The devices in columns 120 and 121 compare LPCs 113 and 111 and store the result on flip-flop 122. In this way, a failure of any one LPC will set two flip-flops. The flip-flop that is not set is the one that stores the comparison for the two devices that are operating without failure, and is therefore indicative of the devices that should be allowed to continue operation. It is a simple and routine matter to arrange suitable logic and sequencing circuits to lock out the bad device, indicate the need for attention, and continue uninterrupted operation.

It is possible that to reduce the overhead associated with this error checking mechanism one or more outputs of the LPCs could be excluded from the set of outputs subject to the comparison process. The omitted outputs may represent functionality that is non-critical to operation. In this case the omitted outputs may be assumed good if coming from a device which is otherwise functioning correctly (so far as its set of compared outputs is concerned) and used accordingly.

It will be apparent that state data modifications made by the user with the system monitoring facilities are part of the general input data for the LPC system. Thus, if two or more LPCs are being operated in parallel for the purpose of failure detection as discussed, then each must receive identical modifications, clock cycle by clock cycle, and the same principle applies to every input signal to the devices.

Improved Protection

An additional level of protection can be provided as follows, the improvement being one of protecting against failures in the failure detection circuitry itself.

In a system with two or three LPCs, it can be arranged that each LPC contains within it a failure detection and/or correction circuit of the type shown in FIG. 12 or 13. A necessary requirement for this is that all of the M output signals from each of the other LPCs must be supplied as inputs for the failure detection and/or correction circuits. When so arranged, each LPC is enabled to monitor its own operation and shut down as appropriate. Each LPC is also enabled to monitor the operation of the other LPC(s) and effect a shutdown or disablement of an LPC as appropriate to the circuits provided and the situation detected. Each LPC may also generate status outputs for the system that indicate the identity of an LPC detected as failing. Duplication of the monitoring circuits provides improved protection.

The duplicated failure detection and/or correction circuits may also be provided external to the LPCs if desired. The user may also be provided with the flexibility to choose the desired level of protection by the provision of suitable failure detection and/or correction circuits as function blocks for inclusion within the user control program.

Monitoring External Circuits

Failures may occur in the wiring of a Programmable Controller system external to the programmable controller itself, or in the sensors and actuators used on the process plant or machinery under control.

This invention provides for the monitoring of actuator operation with sensors, and for the monitoring of sensor operation by the use of duplicate sensors. A function block may be provided within the user control program circuit that accepts two or more sensor inputs.

The function block monitors the validity of the sensor inputs. With Boolean signals, the signals would be considered valid if they do not differ in value from each other for longer than some user specified interval dependent on the process plant or machinery under control. With digitally encoded continuous value signals, the signals would be considered valid if they do not differ in value from each other by greater than a user specified amount for longer than some user specified interval. Both the user specified amount and interval would be dependent on the process plant or machinery under control.

Where failure detection only is provided, the function block provides continuous monitoring of the appropriate duplicate input signals, and passes on a single copy of the signal if judged good; otherwise an error output from the function block is activated.

Where three or more duplicate input signals are available, the function block may also compare each against the others. By determining which are the same within the set criteria, and which are not, the function block may determine which are in error and which are good using techniques equivalent to those for LPC outputs described with FIG. 13.

Where Boolean signals are compared, XOR gates, as per FIG. 12 or 13 as appropriate, are used to generate difference signals. The difference signals trigger a digital edge-triggered re-triggerable one-shot. An error is deemed to exist if the difference signal is still true when the one-shot times out.

When digitally encoded continuous value signals are compared, the principles are the same, but the comparison means is dependent on the type of encoding used. The encoding may be via, for example, parallel Boolean signals, pulse width modulation, frequency modulation or any of many other standard encoding methods.

Speed of Response

The first characteristic of the invention that will be apparent to a person skilled in the art of programmable controllers will be the increase in speed of response provided by a PLD based Programmable Controller over that provided by a processor based unit.

It will be apparent that the instruction processing inherent with processor based programmable controllers slows the response. The processing involves—

1. Reading in all external input values.
2. Processing all relevant parts of the user control program taking input values and internal data values into account.
3. Writing out all required output values.

Stages 1 ant 3 above are often referred to in combination as the I/O scan, and stage 2 is similarly referred to as the Program scan.

The three steps are similar to the LPC processing stages, except that they require the services of a processor fetching and executing instructions, and typically take many clock cycles to complete.

The three steps repeat continuously like a recording on an endless loop of tape. Typical scan times around the loop may be 1 to 20 ms and are dependent on program size. If a new input value arrives just too late to be read in stage 1, then it must wait a complete scan before being read and most of another full scan before any new resulting output value is written to the process under control.

Real world processes may require many successive scans to perform a required action and the sum of the scan times can be a limiting factor in terms of process control performance.

A PLD based Programmable Controller processes its logic at hardware speeds. Although it is envisaged that asynchronous inputs will be sampled at defined clock edges, the time taken for a new input value to generate a new output value can be expected to be measured in microseconds. Although the interface circuits required to provide noise immunity and the data transfers required by monitoring services will slow the response, a PLD based Programmable Controller can still be expected to be many times faster than a processor based Programmable Controller.

The increase in speed of response is very significant to the control of fast machinery and systems.

Flexibility

With the new architecture, different sizes of Programmable Controller can be provided by changing the size of the PLD used. The PLD based Programmable Controller requires no built-in software system. The development system software is the same independent of Programmable Controller size other than requiring different PLD fitter modules for different PLDs.

Additional hardware functionality, including specialist fast hardware functionality, can be provided via the user control program with function blocks taken from a library provided by the Programmable Controller supplier or built from the basic logic elements supported by the programming system.

At this time, functions as complex as complete microprocessors are available for purchase or licensing and use within Programmable Logic Devices. That is not to say that microprocessors would represent a reasonable choice for an industrial controls designer, but the possibility is mentioned to show that the functions incorporated could be of considerable complexity.

This emphasises that the invention represents a platform and means of assembly on which many varied systems from the simplest to the most complex can be built.

It should also be noted that a Programmable Controller supplier would undoubtedly want to provide a full set of function blocks carefully designed to be easy and fool-proof to use. The optimal form of the function blocks for Programmable Controller use may be very different to those for electronic circuit design use, and will in any case need to be compatible with the required data transfers.

Having made the above points, it should be said that the use of a good Hardware Description Language based development system allows for the provision of library functions that—
- Incorporate considerable complexity and functionality,
- May operate by means of an embedded microprocessor or other complex logic invisible to the user, and
- Have a very simple user interface Hardware Description Language development methods allow for a library function to be fully tested by its supplier, to be incorporated with ease by the user, and to be configured, inclusive of any embedded microprocessor, within the PLD by the download of a bitmap.

The result of being able to download hardware functionality is both an ability to upgrade systems easily in the field, and a reduction in the requirement for product model variations where each model offers a variation on the functionality of the others.

Reliability

The invention is suited to implementation with a minimum of components and can easily incorporate failure detection and correction. As such, it can offer a very high level of reliability, compensating even for failures in associated wiring, sensors and actuators.

When implemented without failure detection and correction, failures in individual circuits within the LPC will generally be limited in effect to the functionality provided by those circuits because of the one to one correspondences between the user control program and the circuits in the LPC. That is not the case with failures in a processor where a failure in any critical item can cause a processor crash and bring the whole system to a halt.

Embedded Microprocessors—Essential Elements

The essential elements of a function block operating by way of an embedded microprocessor are—
- The embedded microprocessor only exists as such after the PLD is configured with a bitmap containing the necessary configuration patterns. Prior to configuration the PLD is just a PLD with no inherent ability to fetch and execute instructions, and no instructions to process.
- The microprocessor forms part of a subsidiary function within the overall user control program. There is no instruction processing controlling a repeating I/O and Program scan such as is characteristic of a Programmable Controller based on one or more processors.
- The principal control logic for the end-user control program is still implemented as a physical circuit configured with a bitmap loaded into the PLD.

External Processors

Nothing discussed here precludes the use of external processors.

A configured PLD used as a Programmable Controller may well exchange information via its I/O with some other processor-based system. It is likely to do so with an MC for program development purposes and with other computers for system supervisory purposes.

It is also envisaged that users may wish to use I/O resources to communicate with external intelligent systems of many kinds and that the necessary interfaces may be implemented partially within the PLD as configured logic and partially in external devices. Such division of responsibilities is normal system design practice and does not detract from the present invention. The PLD based Programmable Controller still remains in control of those functions designated for it by the user.

Soft Instruments

It will be noted that the facility to handle function blocks within the user control program, and also to edit and modify the program while it is running, allows the user to add special function blocks for diagnostic purposes, and to modify or remove the function block connections at will. The user can effectively add soft instrumentation to the user circuit, and re-connect it as convenient, all without stopping the user control program, just as would be done with a discrete circuit consisting of separate physical components instead of function blocks.

The ability to easily add and remove diagnostic function blocks (DFBs) is of considerable value. Complex DFBs can use much PLD capacity. Much of the time only small sections of the user circuit will require the use of DFBs. The kind of DFB required, and which section requires it will vary from time to time. The ability to modify an operative program while still maintaining proper control allows the user to make best use of the PLD capacity, and to minimise the time spent in resetting machinery.

Advantages

Means of controlling the program, displaying, modifying and forcing data, modifying the program while it is operating, and detecting and correcting operational failures are provided. The Programmable Controller is highly flexible as to the functions performed and fast in response to input signals. The hardware circuits required to implement the controller are simple and require only a few components.

All types of control functionality can be implemented on the new architecture because ladder diagrams, logic diagrams, sequence controls and function blocks can all be expressed in logic circuit form.

The invention claimed is:

1. A programmable controller for use with a monitoring device, said programmable controller including:
at least one digital input interface,
at least one digital output interface for receiving data from at least one output register,
programmable logic hardware including a plurality of logic elements including flip-flops, and electrically configurable interconnections, said interconnections configurable to interconnect the logic elements as a logic processing circuit, said logic processing circuit arranged to implement a user control program defined by a user as a user control program circuit, said logic processing circuit configurable in said programmable logic hardware, and connected to said at least one digital input interface and said at least one digital output interface,
program loading circuits for configuring said programmable logic hardware with said logic processing circuit prior to initiating control, and where said programmable logic hardware, configured with the logic processing circuit, includes:
a plurality of logic processing circuit flip-flops for storing state data, and for each of these flip-flops, an associated support circuit, the support circuits arranged to operate selectively between first and second conditions, wherein in said first condition the support circuits cause the flip-flops to act as a shift register for transporting state data into and out of the logic processing circuit, and wherein in the second condition the support circuits cause the flip-flops to act as logic elements of said user control program, the support circuits being selected to operate in only one of either the first condition or the second condition at any one time, and
a monitoring services and control unit arranged to control and operate said logic processing circuit including:
a continuously cycling logic processing scan at least including said support circuits in both said first condition and said second condition, and when in said first condition said support circuits are arranged to operate to shift state data out of and into said logic processing circuit to provide read and write access to said plurality of logic processing flip-flops; and when in said second condition said programmable controller is arranged to operate to apply user clock pulses to said logic processing circuit and to update said at least one output register,
wherein said monitoring services and control unit is further arranged to perform a program swap operation, including circuits arranged to:
configure into an incoming section of programmable logic hardware an incoming logic processing circuit including an incoming user control program circuit,
terminate the continuously repeating logic processing circuit scan of an outgoing logic processing circuit and maintain the value stored in said at least one output register,
ensure the output data in the said at least one output register remains unchanged from the output data last stored from the user control program circuit when said support circuits were operated according to said second condition,
read the state data from said outgoing user control program circuit,
write the state data from said outgoing user control program circuit into the corresponding incoming state data storage units so that each state data bit in said incoming user program circuit that has a corresponding bit in said outgoing user control program circuit has its state set to the same state that existed in the corresponding bit in said outgoing user control program circuit, said write the state data including relocating, as necessary, state data bits at different addresses in said incoming section as compared to the addresses in said outgoing section from which they were read, and
start the continuously repeating logic processing circuit scan of said incoming logic processing circuit, and enabling said at least one output register to be updated.

2. The programmable controller as claimed in claim 1 further including circuits arranged to facilitate relocation of user control program circuit state data from a logic processing circuit in said outgoing section into the user control program circuit in a logic processing circuit in said incoming section, and circuits arranged to facilitate including:
relocating address memory circuits arranged to provide the address of a first bit in a pair of corresponding bits as a function of the address of the second bit in the same pair of corresponding bits.

3. The programmable controller as claimed in claim 2, wherein said monitoring services and control unit is arranged to operate to perform a program swap, said programmable logic hardware arranged in separately configurable sections, said sections including:
an outgoing section, said outgoing section having an outgoing logic processing circuit arranged to operate, prior to the program swap, in a continuously repeating logic processing circuit scan cycle, and
an incoming section, said incoming section being inoperative prior to the program swap.

4. The programmable controller as claimed in claim 3 further arranged to allow the continuance of circuit operation after the occurrence of a circuit operational failure of a type that does not cause permanent physical damage to said programmable controller, including:
at least three separately configurable blocks of programmable logic hardware, each said block being equivalent to one said outgoing section and one said incoming section, and performing in order the steps of:
operating each said block in parallel and in synchronism,
identifying circuit failures, by comparing on a clock-by-clock basis the operation of each said block against each other said block, and determining when at least one said block operates differently to the other said blocks, reconfiguring each said block that has failed and pausing the non-failing said blocks thus preserving the value stored in said output registers, transferring the state of the non-failing said blocks to the reconfigured said block(s), and restarting said blocks by enabling logic processing in parallel and in synchronism and enabling said output registers to be updated.

5. A programmable controller for use with a monitoring device, said programmable controller including:

at least one digital input interface, at least one digital output interface for receiving data from at least one output register, programmable logic hardware including a plurality of logic elements including flip-flops, and electrically configurable interconnections, said interconnections configurable to interconnect the logic elements as a logic processing circuit, said logic processing circuit arranged to implement a user control program defined by a user as a user control program circuit, said logic processing circuit configurable in said programmable logic hardware, and connected to said at least one digital input interface and said at least one digital output interface, program loading circuits for configuring said programmable logic hardware with said logic processing circuit prior to initiating control, and where said programmable logic hardware, configured with the logic processing circuit, includes:

a plurality of logic processing circuit flip-flops for storing state data, and for each of these flip-flops, an associated support circuit, the support circuits arranged to operate selectively between first and second conditions, wherein in said first condition the support circuits cause the flip-flops to act as a shift register for transporting state data into and out of the logic processing circuit, and wherein in the second condition the support circuits cause the flip-flops to act as logic elements of said user control program, the support circuits being selected to operate in only one of either the first condition or the second condition at any one time, wherein said plurality of logic processing circuit flip-flops are interconnected to form a shift register by the programmable configuration process, and a monitoring services and control unit arranged to control and operate said logic processing circuit including:

a continuously cycling logic processing scan at least including said support circuits in both said first condition and said second condition, and when in said first condition said support circuits are arranged to operate to shift state data out of and into said logic processing circuit to provide read and write access to said plurality of logic processing flip-flops; and when in said second condition said programmable controller is arranged to operate to apply user clock pulses to said logic processing circuit and to update said at least one output register, wherein said monitoring services and control unit is further arranged to perform a program swap operation, including circuits arranged to:

configure into an incoming section of programmable logic hardware an incoming logic processing circuit including an incoming user control program circuit, terminate the continuously repeating logic processing circuit scan of an outgoing logic processing circuit and maintain the value stored in said at least one output register, ensure the output data in the said at least one output register remains unchanged from the output data last stored from the user control program circuit when said support circuits were operated according to said second condition, read the state data from said outgoing user control program circuit, write the state data from said outgoing user control program circuit into the corresponding incoming state data storage units so that each state data bit in said incoming user program circuit that has a corresponding bit in said outgoing user control program circuit has its state set to the same state that existed in the corresponding bit in said outgoing user control program circuit, said write the state data including relocating, as necessary, state data bits at different addresses in said incoming section as compared to the addresses in said outgoing section from which they were read, and start the continuously repeating logic processing circuit scan of said incoming logic processing circuit, and enable said at least one output register to be updated.

6. The programmable controller as claimed in claim 5 further including circuits arranged to facilitate relocation of user control program circuit state data from a logic processing circuit in said outgoing section into the user control program circuit in a logic processing circuit in said incoming section, said circuits arranged to facilitate including:

relocation address memory circuits arranged to provide the address of a first bit in a pair of corresponding bits as a function of the address of the second bit in the same pair of corresponding bits.

7. The programmable controller as claimed in claim 6, wherein said monitoring services and control unit is arranged to operate to perform a program swap, said programmable logic hardware arranged in separately configurable sections, said sections including:

an outgoing section, said outgoing section having an outgoing logic processing circuit arranged to operate, prior to the program swap, in a continuously repeating logic processing circuit scan cycle, and an incoming section, said incoming section being inoperative prior to the program swap.

* * * * *